United States Patent

Nagasawa et al.

[11] Patent Number: 5,867,474
[45] Date of Patent: Feb. 2, 1999

[54] OPTICAL DISK HAVING A CONTINUOUS INFORMATION TRACK FORMED OF ALTERATING LAND/GROOVE REVOLUTIONS AND OPTICAL DISK DRIVE

[75] Inventors: Masato Nagasawa; Kazuhiko Nakane; Tsuyoshi Katayama; Kouichi Komawaki, all of Tokyo, Japan

[73] Assignee: Mitsubishi Denki Kabushiki Kaisha, Tokyo, Japan

[21] Appl. No.: 747,607

[22] Filed: Nov. 13, 1996

[30] Foreign Application Priority Data

Dec. 1, 1995 [JP] Japan ................... 7-314070

[51] Int. Cl.$^6$ .............................................. G11B 7/24
[52] U.S. Cl. .................... 369/275.3; 369/275.4
[58] Field of Search ............... 369/275.3, 275.6, 369/275.2, 13, 275.1, 277, 278, 279, 272

[56] References Cited

U.S. PATENT DOCUMENTS

| | | | |
|---|---|---|---|
| 5,199,022 | 3/1993 | Suzuki et al. | 369/275.1 |
| 5,422,874 | 6/1995 | Birukawa et al. | 369/275.2 |
| 5,508,995 | 4/1996 | Moriya et al. | 369/275.4 |

FOREIGN PATENT DOCUMENTS

| | | |
|---|---|---|
| 0607445 | 7/1994 | European Pat. Off. . |
| 0628952 | 12/1994 | European Pat. Off. . |
| 0628952A2 | 12/1994 | European Pat. Off. . |
| 0757343A1 | 8/1996 | European Pat. Off. . |
| 0770993 | 5/1997 | European Pat. Off. . |
| 57530330 | 3/1982 | Japan . |
| 729185 | 1/1995 | Japan . |
| 750014 | 2/1995 | Japan . |
| 2307589 | 5/1997 | United Kingdom . |

*Primary Examiner*—Ali Neyzari

[57] ABSTRACT

In an optical disk having information recording tracks in the form of land and groove tracks, the disk is divided into a plurality of annular zones, each revolution of the information recording track belongs to one of the zones, and each revolution of the information recording track is divided into a plurality of sectors. A header portion is provided at the head of each sector which includes a recognition pattern formed of a sequence of pits. The recognition pattern has a pattern which is not used as a pattern for data or addresses in the information recording part. The disk may be of a land/groove single-spiral configuration. The header portion for each sector may have a plurality of sub-headers, including an address of the sector, and first and second recognition patterns. The address of the sector and the first recognition pattern may be shifted in one radial direction by half a track pitch and the second recognition pattern shifted in the other radial direction by half a track pitch.

27 Claims, 30 Drawing Sheets

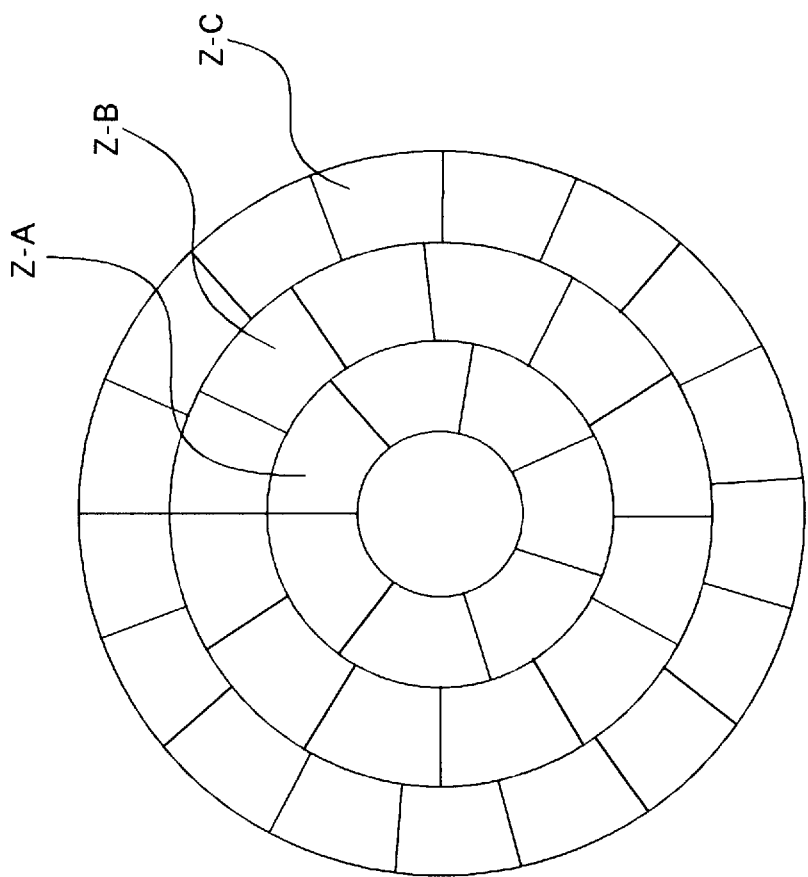

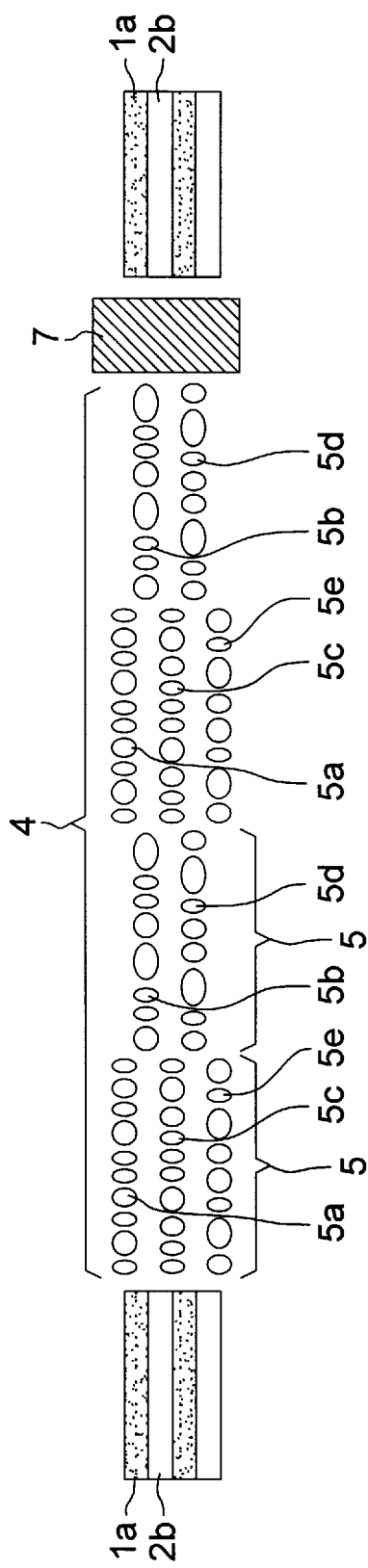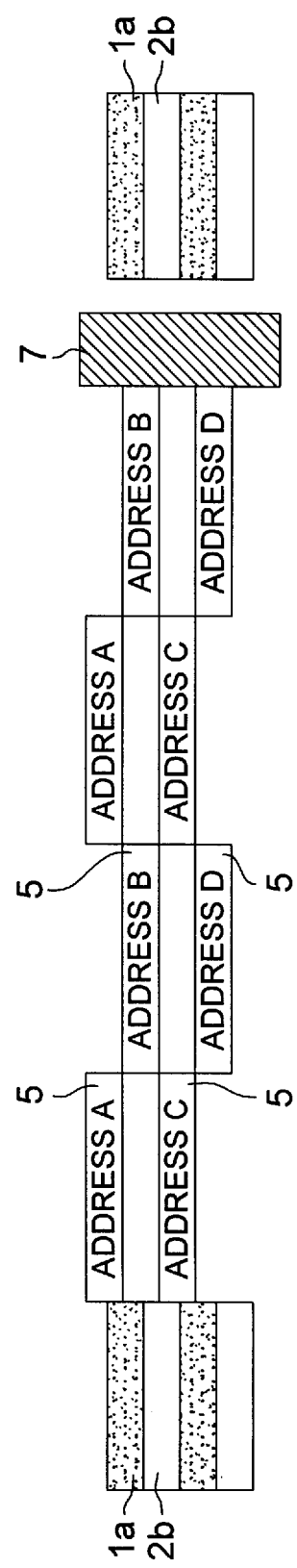

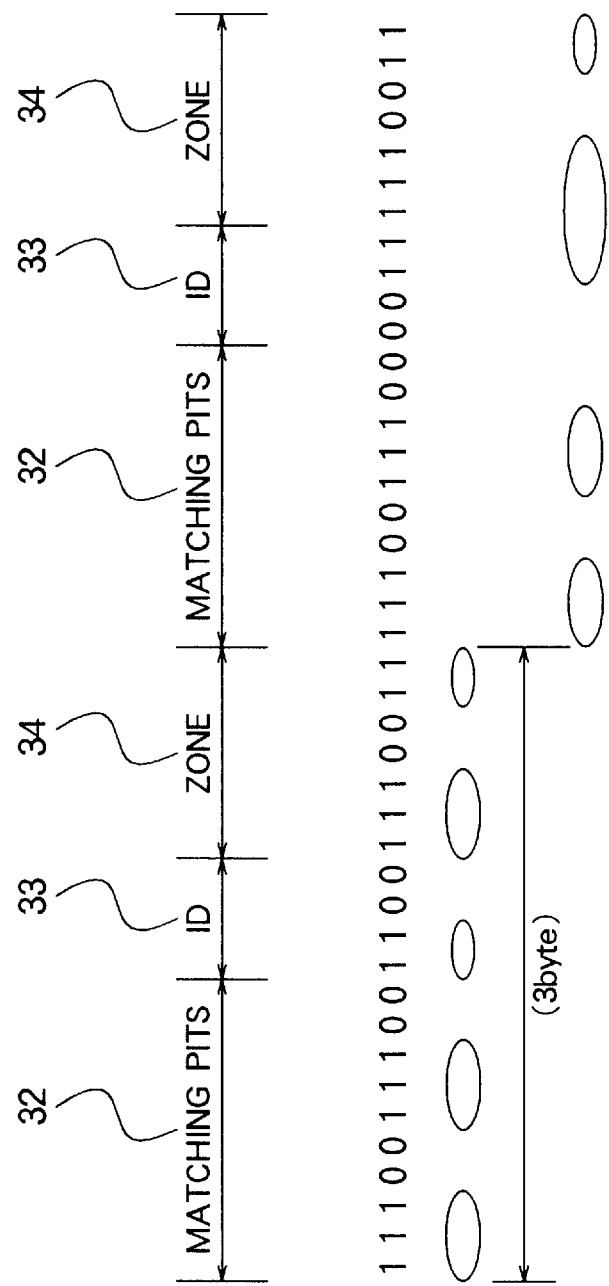

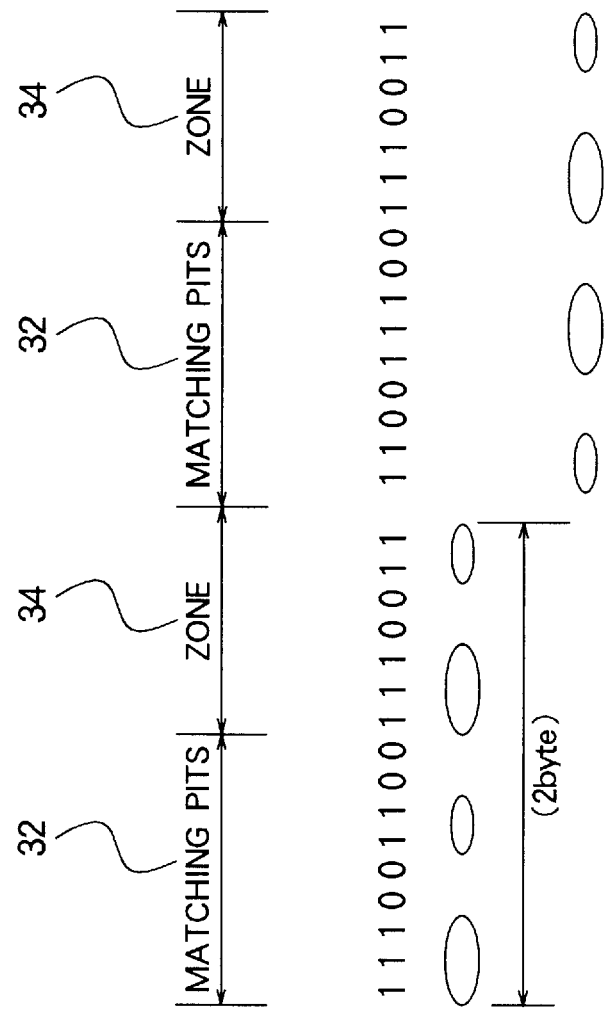

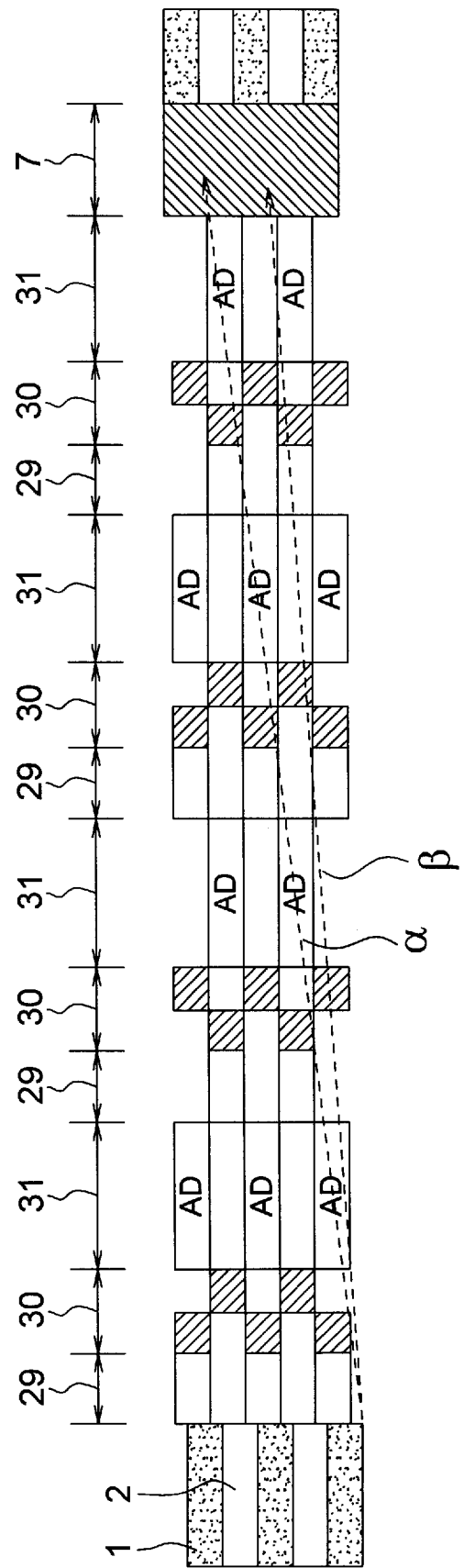

OPTICAL DISK HAVING A CONTINUOUS INFORMATION TRACK FORMED OF ALTERATING LAND/GROOVE REVOLUTIONS AND OPTICAL DISK DRIVE

BACKGROUND OF THE INVENTION

The present invention relates to an optical disk in which information is recorded both on land and groove tracks.

The invention also relates to an optical disk drive device using such an optical disk.

More particularly, the invention relates to recognition patterns used for recognition of the header part provided in front of each information sector.

In conventional phase-change type optical disks, data is recorded only on grooves, and lands serve to guide the light spot for tracking, and to reduce crosstalk from adjacent groove tracks. If data is recorded on lands as well, the track density can be doubled on condition that the width of the grooves and the width of the lands are both unchanged. It has been discovered that the crosstalk between adjacent land and groove tracks is reduced if the difference in height between the lands and grooves is $\lambda/6$ ($\lambda$ being the wavelength of the light source). Because of this discovery, the use of both land and groove tracks has become feasible. The use of both land and groove tracks is also advantageous with regard to the ease of mastering of the disk: it is easier to attain a certain recording density by the use of both land and groove tracks than by reducing the track pitch using only the groove tracks.

For instance, in the case of optical disks for use as computer data files, optical disks in which data is recorded both on land and groove tracks, and the tracks are concentric, so that after recording of one revolution (on a groove track, for example), a track jump is effected to start writing on the adjacent track (a land track). Sectors are managed in accordance with the sector addresses. Accordingly, the operation for recording and reproducing data, such as computer data, which need not be continuous, can be carried out without difficulty.

Rewritable optical disks are however also used for recording continuous data such as motion picture, or music. In multimedia applications (where computer data and video and audio data are mixed), spiral tracks, as in compact disks, may be preferred because of the continuity of the tracks.

In this case, the tracks need to be formed into a spiral form rather than a concentric form. However, in an optical disk in which the information is recorded both on lands and grooves and the tracks are spiral, it is necessary, after tracing the entire spiral formed of all the land tracks, for example, and groove tracks, to jump from the end of the land track spiral to the beginning of the groove track spiral. It is then necessary to access from the inner periphery to the outer periphery of the disk. Such an operation is time-consuming. In a disk which is divided into annular zones, the track jump is made from the inner periphery of the zone to the outer periphery of the zone, and the time for the jump is shortened but there is still a similar problem.

FIG. 23A and FIG. 23B show details of the header region 4 in a conventional optical disk wherein data is recorded on both groove and land tracks. FIG. 23A shows the case where headers are provided separately for the land and groove tracks, and addresses dedicated to the respective tracks are formed. FIG. 23B shows the case where headers are provided on an extension of a boundary between land and groove tracks, and each address is shared by the land track and the groove track separated by the boundary. In either case, the headers include address pits.

The header portion is formed of embossments (dents or projections) physically formed for representing the address information and the like of the sector preceded by the header, the sector being a unit for recording data. Specifically, pits having the same height as the lands, or pits having the same depth as the grooves are formed in the header portion where no tracks are formed.

There are several methods for forming prepits suitable for the land/groove recording configuration. Two principal ones are those shown in FIG. 23A and FIG. 23B.

In the configuration shown in FIG. 23A, dedicated prepits are provided for each sector of the land or groove track. Because the dedicated prepits can record various items of information, such as the one indicating whether the sector following the dedicated prepits is in a land track or a groove track, control in the optical disk drive device is facilitated. However, the width of the prepits must be sufficiently narrower than the track width. This means that the laser beam used for forming the tracks cannot be used for forming the prepits, and the fabrication of the medium is difficult.

In the configuration shown in FIG. 23B, the prepits are shared by the land and groove tracks adjacent to each other. The prepits can be formed by using the same laser beam as that used for forming the tracks, and by shifting the laser beam by ½ of the track pitch laterally of the track, i.e., in the radial direction of the disk. However, during writing or reading of the disk, the shared prepits cannot indicate whether the sector following the prepits is in a land track or groove track, so that the optical disk drive device must have a means to find whether a land track or groove track is being traced by the light spot, and the control in the optical disk drive device is difficult.

In the above-described optical disk allowing recording and reproduction, it is also necessary to solve the problem of the track offset. This relates to the fact that the one beam-and-push-pull method is used for the tracking, rather than a three-beam method. This is because the recording requires a greater laser power. Also, in the case of pit-forming recording, such as the one on a write-once disk, the side spots (used in a three-beam method) causes a disturbance to the tracking operation.

In a push-pull tracking, the tracking error is detected using the diffraction distribution of the light spot illuminating the pregrooves as shown in FIG. 24, and fed to the servo system, so that offset may occur due to the eccentricity of the disk or tilting of the disk. More particularly, an optical head 10 has a laser diode 66 emitting a laser beam, which is passed through a half-mirror 65 and an objective lens 67 to illuminate an optical disk 8 rotated by a disk motor 9. The reflected light beam from the light spot on the disk 8 is guided by the objective lens 67 and the half-mirror 65 and is received by a photodetector 11, and the tracking error is detected using the diffraction distribution of the light spot on the optical disk 8. The detected tracking error is used to control an actuator coil 64 for driving the objective lens 67.

For instance, a tilt of 0.7 degrees or an eccentricity of a 100 $\mu$m (equivalent to lateral movement of the objective lens 62 of 100 $\mu$m as indicated by broken lines in FIG. 24) causes shifting of a light distribution 12 on the photodetector 11, and hence an offset of 0.1 $\mu$.

To prevent such a phenomenon, a drive device having higher mechanical and optical accuracy is used, and various other contrivances are adopted.

FIG. 25A shows the method of mirror surface correction in which a mirror surface part 7 is used. FIG. 25B shows the pit configuration of the optical disk used in combination with the wobble pits correction method.

In this method, wobble pit pits 68 and 69 being shifted in the radial direction of the disk by ½ of the track pitch are used. These methods are described in the following publications:

(1) Ohtake, et al. "Composite Wobbled Tracking in the Optical Disk System," on pp. 181–188 in Optical Memory Symposium '85, held on Dec. 12–13 in 1985, published by Optical Industry Technology Promotion Association, (2) Kaku, et al. on "Investigation of compensation method for track offset," pp. 209–214 in Optical Memory Symposium '85, held on Dec. 12–13 in 1985, published by Optical Industry Technology Promotion Association.

FIG. 26 shows a track offset correction circuit used in combination with a disk having the mirror surface portion 7 shown in FIG. 25A. A split photodetector 70 detects the tracking error by a push-pull method. An adder 15 adds the outputs of the two half-portions of the split photodetector 70 to produce a signal indicative of the total amount of light received, which corresponds to the total amount of light reflected from the disk. A differential amplifier 16 determines the difference between the outputs of the two half-portions of the split photodetector 70, to produce a signal indicative of the tracking error. A mirror surface detector 20 detects the mirror surface portion 7. A sample-hold circuit 23 samples and holds the tracking error signal when the light spot passes the mirror surface portion 7, and holds the sampled value as an offset information. A differential amplifier 47 determines the difference between the tracking error signal and the offset information. The output of the differential amplifier 47 indicates the tracking error having the offset removed.

FIG. 27 shows an offset correction circuit used in combination with a disk having wobble pits shown in FIG. 25B. A wobble pit detector 22 receives the output of the adder 15, and detects the wobble pits, i.e., produces a signal to a sample-hold circuit 23 when the light spot passes the wobble pit laterally shifted toward one side of the track, and produces another signal to a sample-hold circuit 24 when the light spot passes the wobble pit laterally shifted toward the other side of the track. Responsive to these signals (i.e., when the light spot passes the wobble pits 68 and 69), the sample-hold circuits 23 and 24 sample the output of the differential amplifier 16, and holds the sampled value. A differential amplifier 27 determines the difference between the outputs of the sample hold circuits 23 and 24, as an offset. An adder 28 adds the tracking error signal obtained at the differential amplifier 27 to the tracking error signal obtained by means of the ordinary push-pull method, to produce the tracking error signal from which the offset has been removed.

FIG. 28 illustrates the control characteristics for the case where a tracking error signal obtained by wobble pits and the tracking error signal by means of the conventional push-pull method are both used. G1 denotes a tracking open loop characteristic by means of the conventional push-pull method, and G2 denotes a tracking open loop characteristic by means of the wobble pits.

In this configuration, the guide grooves are discontinuous or interrupted at the mirror surface portion 7. With this configuration, a correction circuit for correcting the mirror surface offset, shown in FIG. 26, is required. The signals output from the two half-portions of the split photodetector 70 are input to the differential amplifier 16, which thereby produces a tracking error signal. The sum signal produced by the adder 15 is supplied to the mirror surface detector 20, which thereby generates a timing signal indicating the timing at which the light beam passes the mirror surface portion, and hence the signal should be sampled. The tracking error signal ΔT produced by the differential amplifier 16 includes an error component ΔTg (error due to the photodetector 70 and the differential amplifier 16), a true tracking error ΔTs, and an offset component δ due to various causes including the tilting of the disk, so that it is given by:

$$\Delta T = \Delta Ts + \Delta Tg + \delta \qquad (1)$$

The sample-hold circuit 23 samples the tracking signal at the mirror surface portion 7, and holds the sampled value for each sector. The output of the sample-hold circuit 23 represents ΔTg+δ. Accordingly, in view of the equation (1), subtracting the output of the sample-hold circuit 23 from the output of the differential amplifier 16 at the differential amplifier 47 results in the true tracking signal ΔTs. In this way, a closed-loop servo system for achieving an accurate track following can be formed.

Another method of correction is a method using wobble pits. According to this method, a pair of sequences of pits shown in FIG. 25B are formed by alternately deflecting the light beam, using ultrasonic deflector, during fabrication of the original disk for mastering. During recording and reproduction, the amounts of the reflected light received when the light spot is passing the wobble pits on the respective sides are compared, to detect the tracking error. Specifically, a differential amplifier 27 shown in FIG. 27 determines the difference between the outputs of the sample-hold circuits 23 and 24 to obtain the tracking error. As shown in FIG. 29, when the light spot passes along a line closer to the center of the pit 68 on one side (top side in FIG. 25B) than to the center of the pit 69 on the other side (bottom side in FIG. 25B), an output signal illustrated by the dotted line is obtained. When the light spot passes along a line closer to the center of the pit 69 on the bottom side than to the center of the pit 68 on the top side, an output signal illustrated by the solid line is obtained. The difference obtained by subtracting the signal (amount of received reflected light) obtained when the light spot is passing the wobble pit 69 at the back, from the signal (amount of received reflected light) obtained when the light spot is passing the wobble pit 68 at the front, represents the magnitude of the tracking error and the direction of the tracking error. This means that the position at which the light spot passes is detected. Compared with the method relying on the diffraction distribution due to pre-grooves, the above-described method realizes a better servo system.

Another tracking method has been proposed, in which the feature of the above-described wobble pit method is maintained, and which is compatible with systems using conventional push-pull tracking method. The sector configuration in this system is composed of an index field with pre-pits shown in FIG. 23B, and data field which the user later utilizes. The index field is provided with address information, as well as wobble pits which may or may not serve also as a sector detection mark, and pre-grooves for tracking.

With such a configuration, the true tracking error is detected from the wobble pits, and the offset used in the push-pull tracking can be corrected. In this case, the open-loop characteristic of the tracking servo is such that the gain for tracking on the basis of the wobble pits is relatively large in the low-frequency region, and the gain for the tracking on the basis of the push-pull method is relatively large in the high-frequency region, as shown in FIG. 28. As a result, data can be recorded and reproduced, while the light spot is maintained on the center of the track, regardless of the drive device used, and compatibility between the recorded disk and the drive device can be preserved.

With the above-described optical disk drive device, information is recorded on lands and grooves to increase the recording density. In such an optical disk, to avoid the complexity of operation during disk-mastering, it was necessary to provide address pits in the header portion, being ½ pitch shifted in the radial direction from the information track, so as to enable reading during tracing of the land track or groove track. Each header is therefore shared by the land and groove, whether the light spot is scanning a land or a groove is not known from the address alone.

The sequences of pits for recording the address information are disposed at positions shifted with respect to the track center, so that when the signal amplitude is lowered or track offset occurs, it is difficult to obtain information reliably. In particular, when the address information is incorrectly read, the recording and reproduction of information over the entire sector cannot be achieved, and fundamental information as to whether the light spot is scanning a land or a groove, or in which zone the light spot is scanning, or the like may become incorrect, and the disk rotation control, tracking control, or the like may fail.

In the case of a disk of a spiral configuration in which a land and a groove alternate every revolution, it is necessary to judge whether the sector following the header is in a land or a groove. This judgment must be reliable, since if this judgment is erroneous, failure of tracking may occur.

Furthermore, because the tracking polarity is reversed every revolution, the polarity of the tracking error signal is reversed every revolution, and error in counting using the tracking error signal during track access, or failure in pull-in at the time of track jump may occur.

In addition, during access, when the boundary between adjacent zones is not known, CLV (constant linear velocity) control is effected after tracking onto the target track, so that the settling requires time. To avoid this problem, a detecting means which can detect the tracking polarity and the current zone position even when tracking is not attained.

SUMMARY OF THE INVENTION

The present invention has been achieved to solve the problems described above, and its first object is to provide an optical disk in which recording can be made on both of lands and grooves, and having recognition patterns in the headers for the information sectors, which can be distinguished clearly from recorded data, and which permits reliable detection with an error rate lower than recorded data.

A second object is to provide recognition patterns in the headers which enable identification of the zone to which the sector belongs, and judgment as to whether the sector is in a land or a groove.

A third object is to provide an optical disk and an optical disk reproducing device by which the recognition patterns in the headers can be decoded even when tracking is not achieved, and disk rotation control can be achieved during access.

A fourth object is to provide an optical disk and an optical disk reproducing device by which the recognition patterns in the headers can be reproduced and decoded even when tracking is not achieved, and the track count error during access can be reduced, and stable pull-in operation to the target track is enabled.

According to one aspect of the invention, there is provided an optical disk having information recording tracks in the form of land and groove tracks, the disk being divided into a plurality of annular zones, each revolution of the information recording track belonging to one of the zones depending on the position in the radial direction of the track,
each revolution of the information recording track being divided into a plurality of sectors of a unit length of information recording in the direction of the scanning,
the disk having a header portion at the head of each sector,
the header portion including a recognition pattern which is formed of a sequence of pits having a pattern which is not used as a pattern for data or address in the information recording part, in the modulation method used.

The disk may be of a land/groove single-spiral configuration in which land tracks and groove tracks are connected at connecting points, occurring every revolution, so that land and groove tracks alternate every revolution along a continuous spiral.

It may be so arranged that the header portion for each sector has a plurality of sub-headers, including an address of the sector, and first and second recognition patterns,
major part of the sub-headers including the address of the sector, and the first recognition pattern are provided, being shifted in one radial direction by half a track pitch with respect to the center of the track of the sector, the second recognition pattern provided being shifted in the other radial direction by half a track pitch with respect to the center of the track of the sector.

With the above arrangement, sequences of information which are not included in the modulation patterns used for the information recording are used for the recognition patterns. The pattern matching during reproduction of the recognition patterns can be effected reliably, and reliable discrimination between the recognition patterns and recording data can be made. Furthermore, a plurality of subheaders including a pair of recognition patterns and the address of the sector are disposed, with the first one of the recognition patterns and the address being shifted by half a track pitch in one lateral direction, with the other recognition pattern being shifted in the other lateral direction. Accordingly, they can be used for detection of track offset, and providing the plurality of pairs of recognition patterns enables comparison, and prevents erroneous detection.

The recognition patterns used for determining the timing of detection of the address data, and timing of detection of wobble pits (formed of the subheaders for the sector which is scanned after the header, and the subheaders for the sector in the next track) and mirror surface part are of a sequence of pits having a pattern which is not used for information recording. As a result, judgment as to whether the reproduced signal represents a recognition pattern or the recorded information can be made reliably. The detection of the address data and tracking offset can be made reliably, and the tracking operation free from offset can be achieved.

A mirror surface part may be provided at the back of the recognition pattern.

The recognition pattern may be formed of pits of different lengths, the minimum length being longer than the minimum pit length of the signal of the data recorded in the information recording part.

With the above arrangement, the information for the recognition patterns can be reproduced even in a state of track deviation.

Also, even when the reproducing spot size is enlarged due to defocusing, because of vibration of the device, for instance, information can be reproduced with a low error rate, and the stability in the offset correction operation and polarity reversal operation is improved.

The recognition patterns in the header may contain an identification code indicating the zone to which the sector belongs.

With the above arrangement, the identification of the zone can be made not only during recording and reproduction of information, but also during track access. Specifically, such identification of the zone can be made even at the time of the servo pull-in when the tracking operation is not yet stable, and when the tracking servo is not applied, during track access.

The recognition patterns in the header may contain an identification code indicating whether the information recording part of the sector is a land or a groove.

With the above arrangement, the identification as to whether the sector is a land or a groove can be made not only during information recording and reproduction, but also during track access.

As a result, in a disk in which the land and groove alternate every revolution to form a continuous track, a continuous track crossing signal, similar to that obtained with the prior art spiral disk, can be obtained.

The headers may be aligned in the radial direction, and the interval between the recognition patterns may be varied.

The interval between the recognition patterns may be varied by varying the length of the VFO.

According to another aspect of the invention, there is provided an optical disk drive device using an optical disk having information recording tracks in the form of land and groove tracks, the disk being divided into a plurality of annular zones, each revolution of the information recording track belonging to one of the zones depending on the position in the radial direction of the track, each revolution of the information recording track being divided into a plurality of sectors of a unit length of information recording in the direction of the scanning,
  the disk having a header portion at the head of each sector,
  the header portion including a recognition pattern which is formed of a sequence of pits having a pattern which is not used as a pattern for data or address in the information recording part, in the modulation method used,
  the device comprising:
  means for generating a light spot and causing the light spot to scan along the track;
  means for receiving light reflected from the disk;
  means for detecting the amount of reflected light; and
  a pattern matching circuit responsive to the means for detecting the amount of reflected light, for detecting the recognition pattern.

According to a further aspect of the invention, there is provided an optical disk drive device using an optical disk in which the information recording tracks are present both on lands and grooves, and the disk being divided into a plurality of annular zones, the disk having an identification code in each header indicating the zone to which the header belongs,
  the device comprising:
  means for generating a light spot and causing the light spot to scan along the track;
  means for receiving light reflected from the disk;
  means for reproducing a signal based on the reflected light;
  means for reading said identification code from the reproduced signal during track crossing, during track access or when the tracking servo is not operating; and
  means for controlling the rotational speed of the optical disk on the basis of the result of the reading.

During track access or when the tracking servo is not operating, the recognition pattern can be reproduced from the reproduced signal during track crossing, and the rotational speed of the optical disk can be controlled on the basis of the result of the reproduced identification code.

As a result, the settling of the motor can be accomplished promptly, and the access time can be shortened in a disk of zone CLV system. In particular, with a phase-change type disk, the recording depends of the linear speed. By shortening the settling time, the average data recording rate can be improved.

According to a further aspect of the invention, there is provided an optical disk drive device using an optical disk in which land and groove tracks alternate every revolution to form a continuous information track, and the disk being divided into a plurality of annular zones,
  the disk having recognition patterns including an identification code indicating whether the header is at a connecting point between a land and a groove,
  the device comprising:
  means for generating a light spot and causing the light spot to scan along the track;
  means for receiving light reflected from the disk;
  means for reproducing a signal based on the reflected light;
  means for reading the identification code from the reproduced signal during track crossing, when the track servo is not operating, and
  means for performing track pull-in after switching the polarity of the tracking error signal on the basis of the reading.

With the above arrangement, the track pull-in operation in a disk having alternating lands and grooves is facilitated. That is, erroneous pull-in to an adjacent track due to the difference in the polarity can be prevented, and the access to the target address can be achieved accurately.

According to a further aspect of the invention, there is provided an optical disk drive device using an optical disk in which lands and grooves alternate every revolution to form a continuous information track, and the disk being divided into a plurality of annular zones,
  the disk having recognition patterns including an identification code indicating whether the header is at a connecting point between a land and a groove,
  the device comprising:
  means for generating a light spot and causing the light spot to scan along the track;
  means for receiving light reflected from the disk;
  means for reproducing a signal based on the reflected light;
  means for reading the identification code from the reproduced signal during track access, and
  means for performing track count from the tracking error signal, after switching the polarity of the tracking error signal on the basis of the reading.

With the above arrangement, continuous track crossing signal is obtained, and the count error (especially, during a high-speed access) is reduced.

According to a further aspect of the invention, there is provided an optical disk drive device using an optical disk having information recording tracks in the form of land and groove tracks, the disk being divided into a plurality of annular zones, each revolution of said information recording track belonging to one of the zones depending on the position in the radial direction of the track, each revolution of the information recording track being divided into a plurality of sectors of a unit length of information recording in the direction of the scanning, the disk having a header portion at the head of each sector, the header portion including a recognition pattern which is formed of a sequence of pits having a pattern which is not used as a pattern for data or address in the information recording part, in the modulation method used, the header further including a VFO, the device comprising:

means for generating a light spot and causing the light spot to scan along the track;

means for receiving light reflected from the disk;

means for reproducing a signal based on the reflected light;

means responsive to the reproduced signal corresponding to the VFO, for generating PLL clock pulses;

means for counting the clock pulses; and means for responsive to the result of the counting, for outputting a signal at a timing at which the light spot scans the wobbling address pits, or the mirror surface part.

BRIEF DESCRIPTION OF THE DRAWINGS

FIG. 2 shows how the zones are configured.

FIG. 3A shows the configuration of the pits in the header region.

FIG. 3B shows the disposition of the address pits in the header region.

FIG. 12 shows a recognition pattern formed of 3 bytes, in an optical disk of Embodiment 1.

FIG. 13 shows a recognition pattern formed of 2 bytes, in an optical disk of Embodiment 1.

FIG. 14 shows the recognition patterns and the traces of the light spot during track crossing, according to Embodiment 2.

DETAILED DESCRIPTION OF THE PREFERRED EMBODIMENTS

Embodiments of the invention will now be described with reference to the drawings.

Embodiment 1

Figure 1A:
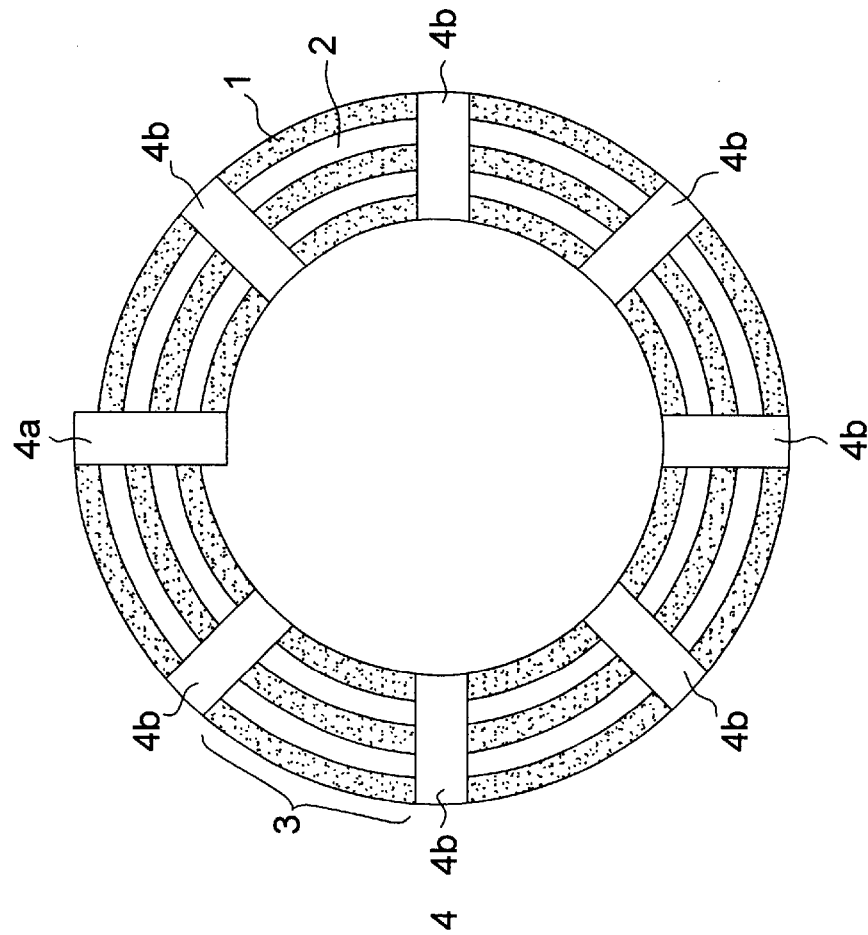
FIG. 1A shows a disk having land and groove tracks forming separate spirals.
Figure 1B:
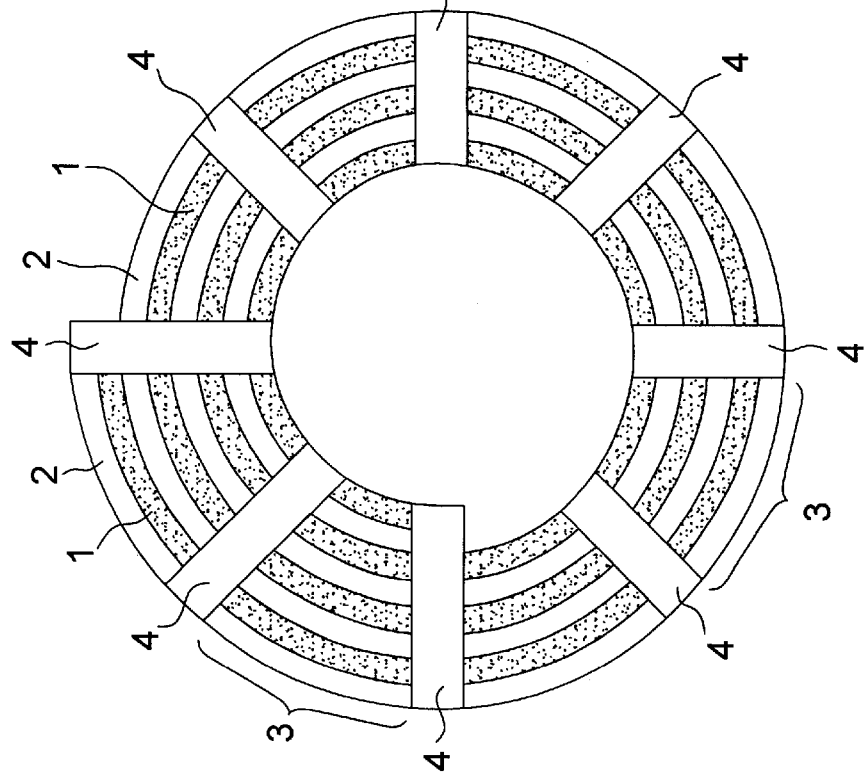
FIG. 1B shows disk a single spiral formed of land and groove tracks alternating every revolution.

Examples of the overall configuration of the disk of this embodiment are shown in FIG. 1A and FIG. 1B. The example shown in FIG. 1A is an optical disk in which all the lands 2 form a single continuous spiral and all the grooves 1 form a separate continuous spiral. The tracks are divided into sectors 3, by header regions 4.

The example shown in FIG. 1B is an optical disk in which lands 2 and grooves 1 alternate every revolution, so that all the grooves 1 and lands 2 in combination form a single continuous spiral. The tracks are divided into sectors 3 by header regions 4a or 4b. The header regions 4a are at a connecting point where the lands and grooves are connected with each other. The header regions 4b are not at a connecting point.

FIG. 2 shows the arrangement of the zones in the optical disk of Embodiment 1. The optical disk is shown to be divided into three zones Z-A, Z-B and Z-C.

The configuration of the header regions 4 in FIG. 1A (or the header regions 4b in FIG. 1B) which are not at the connecting point are illustrated in FIG. 3A and FIG. 3B. Specifically, FIG. 3A shows an arrangement of pits, and FIG. 3B shows an arrangement of address data.

The header in each header region is associated with the sector following the header. In the example shown in FIG. 1A and FIG. 1B, there are 8 sectors per revolution. In an actual design of an optical disk, there are tens of sectors per revolution.

A groove track 1a (one of the groove tracks 1, but denoted by 1a for distinction from other groove tracks 1) is interrupted by the header region (4 or 4). That is, the groove track 1a on one side (e.g., to the left of the header region in FIG. 3A) and the groove track 1a on the other side (to the right of the header region) are aligned with each other, and the light spot having passed the groove track 1a on the left, crosses the header region 4, and then traces the groove track 1a on the right.

Two subheaders 5a in the header region 4 each include a sequence of address pits 31a which indicates the address of the sector in the groove track 1a following the header region 4 and is shifted in a first direction lateral of the groove track 1a, i.e., radially inward (or upward in FIG. 3A) by half a track pitch (a full track pitch being the distance between the land and groove tracks adjacent to each other). Two subheaders 5b in the header region 4 each includes a sequence of address pits 31b which indicates the address of the sector in the land track 2b following the header region 4 and is shifted in the same, first direction lateral of the land track 2b, i.e., radially inward (or upward in FIG. 3A) by half a track pitch.

The subheaders 5a and 5b including the address pits 31a and 31b, respectively, for the sectors in the groove and land tracks, following the header region are shifted with respect to each other in the direction of the track, so that they do not overlap in the radial direction.

Because the address pits (31a and 31b, for example) for the sectors on groove and land tracks 1a and 2b adjacent to each other are not overlapped with each other, the pitch of the address pits in the radial direction is twice the track pitch. The address pits may therefore have the same width as the land or groove tracks, so that the address pits can be formed using the same laser beam as that used for forming the land or groove tracks.

The combination of the sequences of pits in the subheaders shifted in alternate directions are also called wobble pits, and serve to provide information indicating the tracking error, as will be described later.

The value or contents of the respective groups or sequences of address pits in the respective subheaders are as shown in FIG. 3B.

In the example shown in FIG. 3B, the same address value (e.g., any of "A," "B," "C," and "D") is repeated twice. That is, the address is duplexed. The same address sector (e.g., A) is represented by the address pits shifted in one direction. Different addresses (e.g., "A" and "B") alternate.

A mirror surface part 7 is a part where no lands and grooves are formed. In other words, grooves and lands are interrupted at the mirror part, and is used for track offset.

In the case of the disk shown in FIG. 1B, at the header regions 4a which are at the connecting points, polarity of the tracking error must be reversed, while at the remaining header regions 4b, the tracking polarity need not be reversed.

Figure 4:
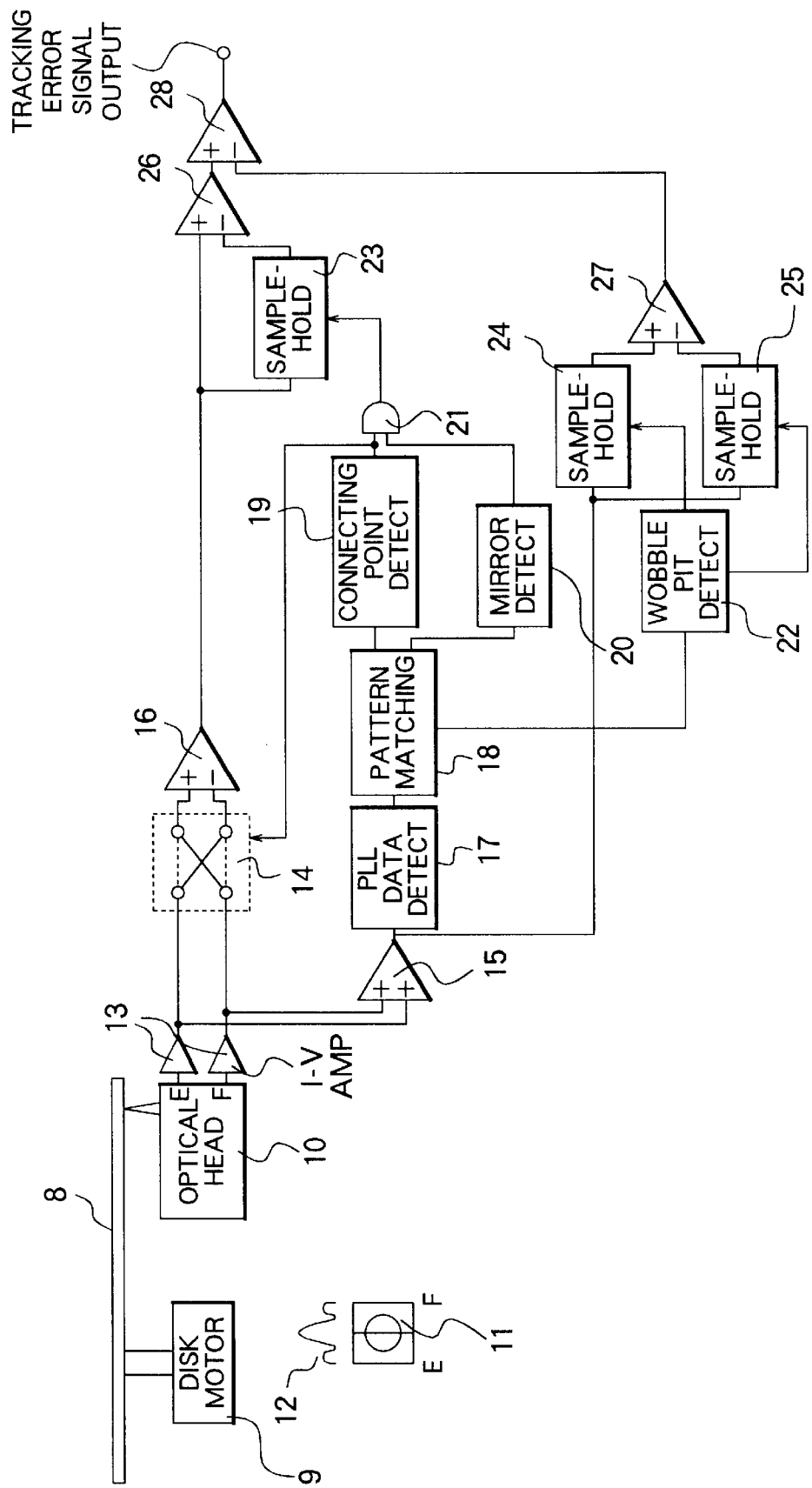
FIG. 4 is a block diagram showing a part of an optical disk drive device concerning the tracking error signal offset correction using wobble pints and mirror surface parts, according to Embodiment 1.

FIG. 4 shows a system in which correction of offset due to polarity reversal is effected by the mirror surface detection method, while the sensor offset due to the conventional push-pull method is corrected by the wobble pits. The illustrated system includes a disk motor 9 for rotating an optical disk 8.

Light reflected from an on optical disk 8 is received by a tracking sensor 11, in the form of a split photodetector, provided in an optical head 10. The tracking sensor 11 is illustrated to be outside of the optical head 10, but it is actually within the optical head 10. A typical distribution of light received by the tracking sensor 11 is also illustrated by a curve 12. I–V amplifiers 13 convert the photo-currents output from the respective half portions of the tracking sensor 11, into voltage signals. A polarity reversing circuit 14 reverses the tracking polarity, i.e., the polarity of the tracking error signal. An adding amplifier 15 determines the amount of light reflected from the optical disk 8. A differential amplifier 16 determines the difference of the outputs of the two half portions of the tracking sensor 11, called E and F channels of the tracking sensor 11.

A PLL and data detecting circuit 17 extracts data from the output of the adding amplifier 15. A pattern matching circuit 18 performs pattern matching, including the pattern matching of the wobble pits.

A connecting point detecting circuit 19 determines whether the header region being scanned is at a connecting point, and hence whether polarity reversal is to be effected. A mirror surface detecting circuit 20 detects the mirror surface part 7 formed on the optical disk 8.

A wobble pit detecting circuit 22 detects the wobble pits, and produces a first signal when the light spot is passing the first sequence of address pits shifted in one direction, and a second signal when the light spot is scanning a second sequence of address pits, next to the first sequence, shifted to the other direction.

A sample-hold circuit 23 samples the tracking error signal when the light spot is found to be passing a mirror surface part 7, and when the header is found to be at a connecting point, and holds the sampled value until the next sampling.

A differential amplifier 26 subtracts the output of the sample-hold circuit 23 from the output of the differential amplifier 16 to remove the offset in the tracking error signal.

A sample-hold circuit 24 samples the output of the adder 15 when when the light spot is scanning the sequence of address pits shifted in one direction.

A sample-hold circuit 25 samples the output of the adder 15 when the light spot is scanning the sequence of address pits shifted in the other direction.

A differential amplifier 27 determines the difference between the outputs of the sample-hold circuits 24 and 25. An adder 28 adds the tracking error signal generated by the wobble pits to the original tracking error signal.

Figure 5:
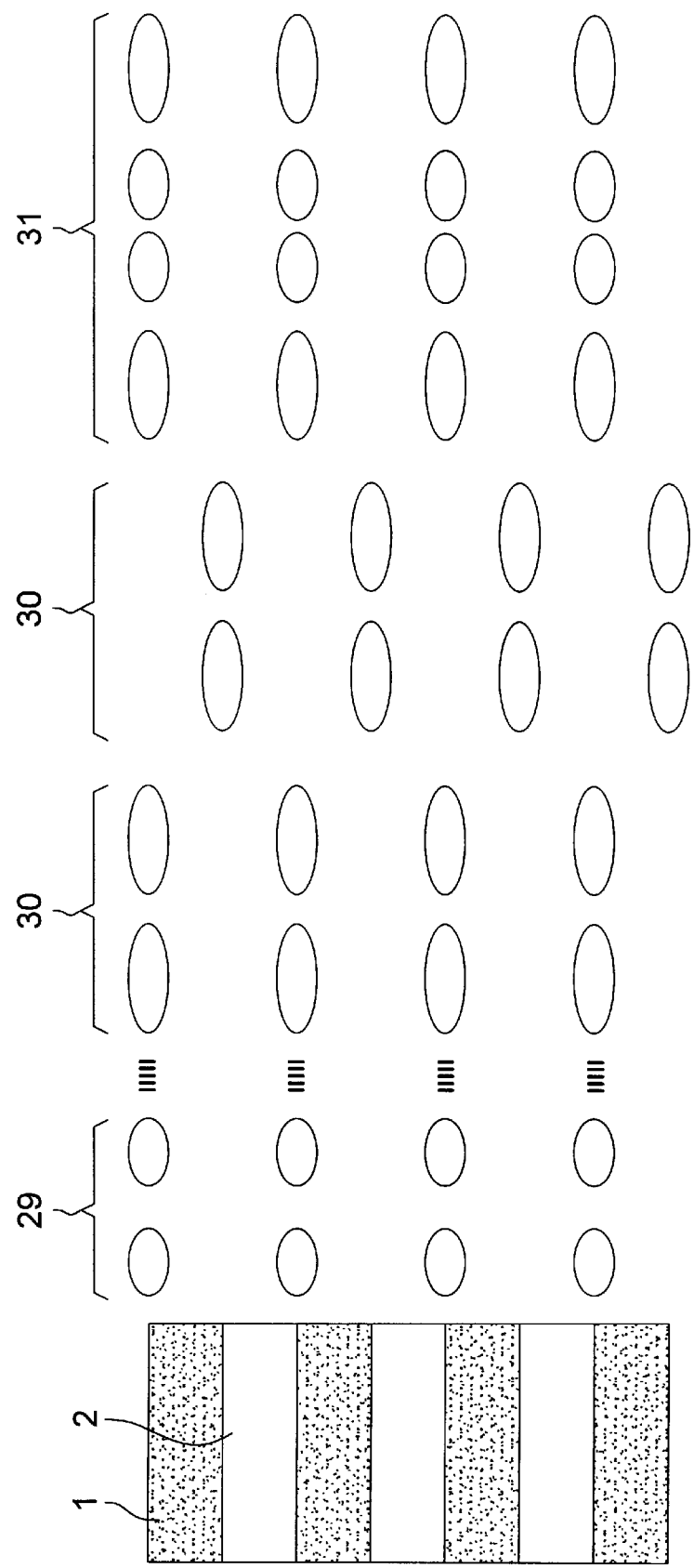
FIG. 5 shows the arrangement of the pits in the header part of the optical disk of Embodiment 1.

FIG. 5 shows the details of the configuration of the pits in the header part in the optical disk of Embodiment 1. It contains VFO 29 for facilitating PLL pull-in, and detection of the address or the like in the header part, recognition patterns 30 for recognition of the header, and address data 31 indicating the address number of the sector.

Figure 6:
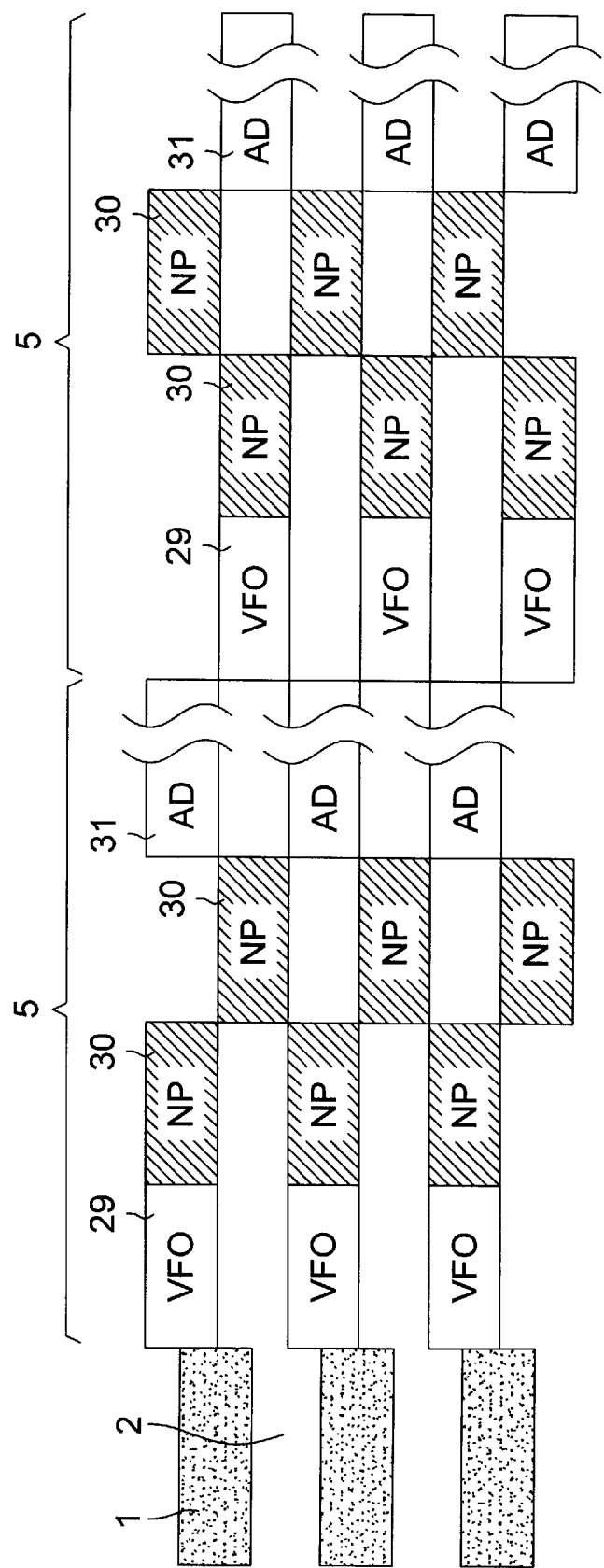
FIG. 6 shows the recognition patterns in the optical disk of Embodiment 1.

FIG. 6 shows the pit configuration of a plurality of sub-headers 5 in the header part 4 in the optical disk of Embodiment 1.

Figure 7A:
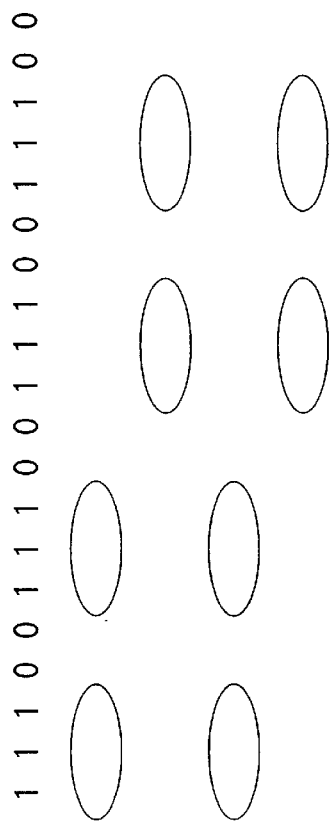
FIG. 7A to FIG. 7C show examples of recognition patterns in an optical disk of Embodiment 1.
Figure 7B:
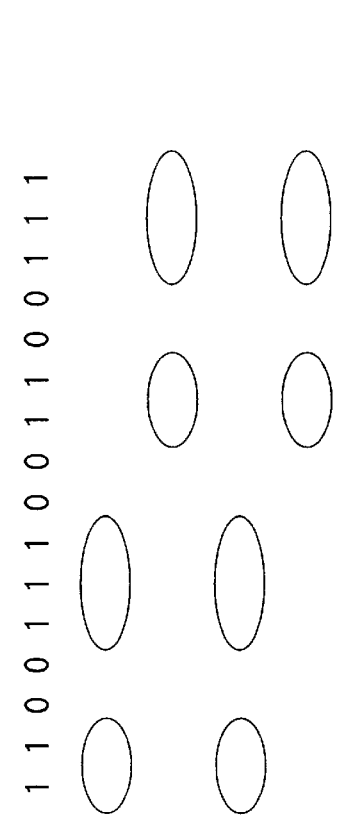
Figure 7C:
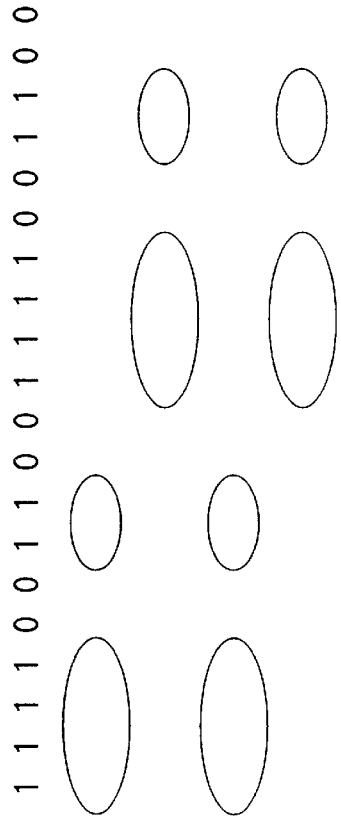

FIG. 7A to FIG. 7C show examples of configurations of the recognition patterns 30 in the header part in the optical disk of Embodiment 1.

Figure 8:
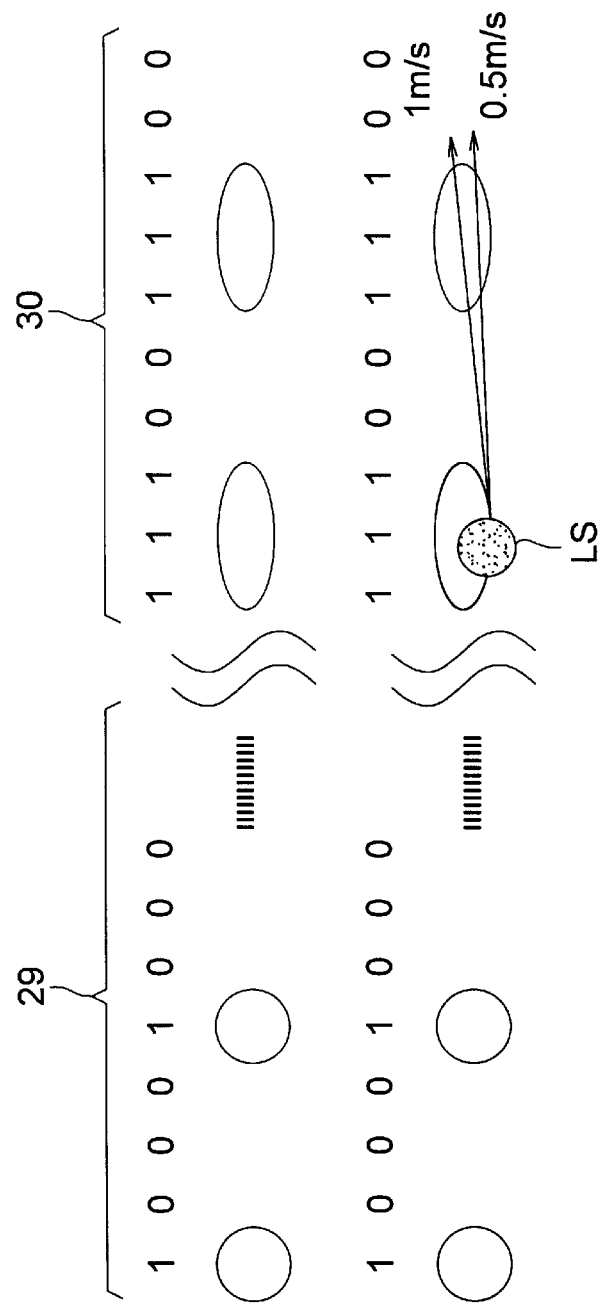
FIG. 8 shows the pit configurations of the recognition patterns in an optical disk of Embodiment 1.

FIG. 8 shows the VFO 29 and recognition pattern 30 in the header part in the optical disk of Embodiment 1, and scanning trace of the light spot LS during track access.

Figure 9:
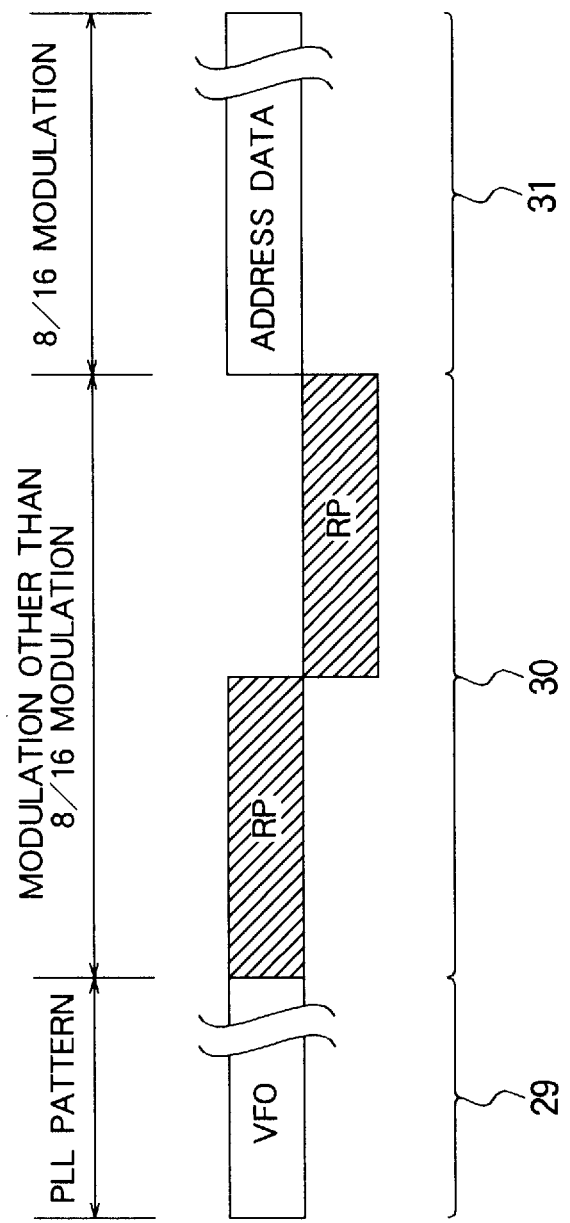
FIG. 9 Shows the configuration of the recognition patterns in an optical disk of Embodiment 1.

FIG. 9 shows the configuration of the sub-header 5 in the header part in the optical disk of Embodiment 1. It includes a VFO 29, recognition patterns (RP) 30 and address data 31.

Figure 10:
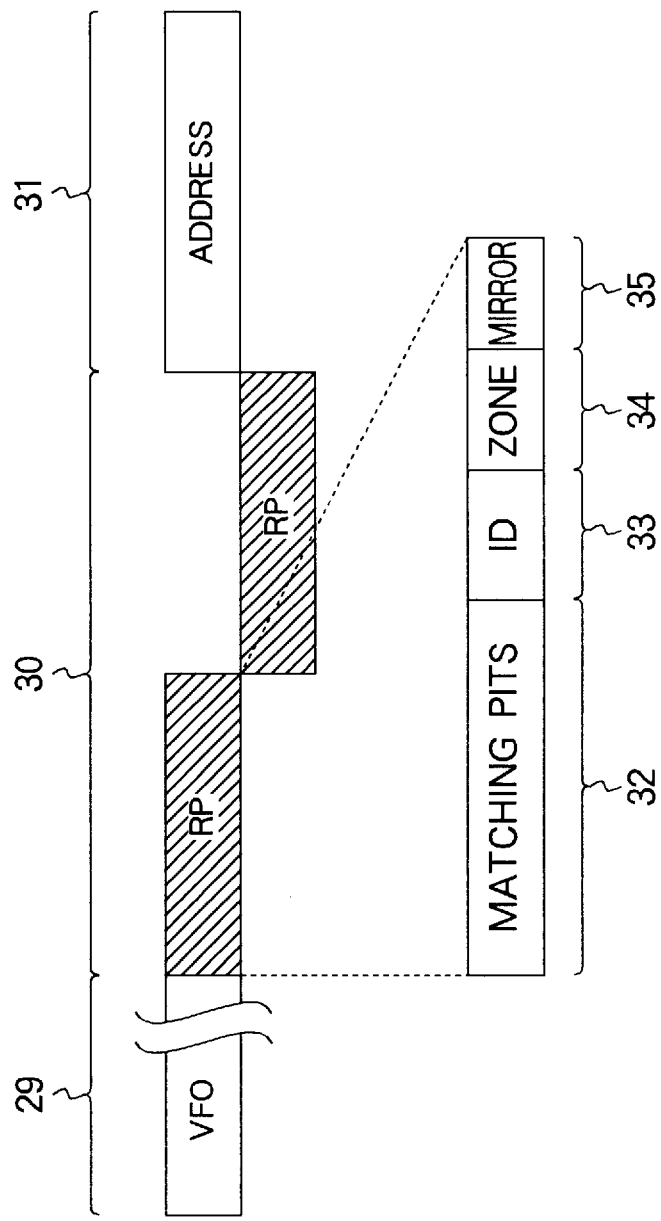
FIG. 10 shows the details of the recognition patterns in an optical disk of Embodiment 1.

FIG. 10 shows the configuration of the recognition patterns 30 in the sub-header 5. It includes matching pits 32, an ID 33 describing the order of the matching pattern within the subheader, zone identifying part 34 indicating the zone to which the header belongs, and a mirror surface 35 for offset correction.

Figure 11:
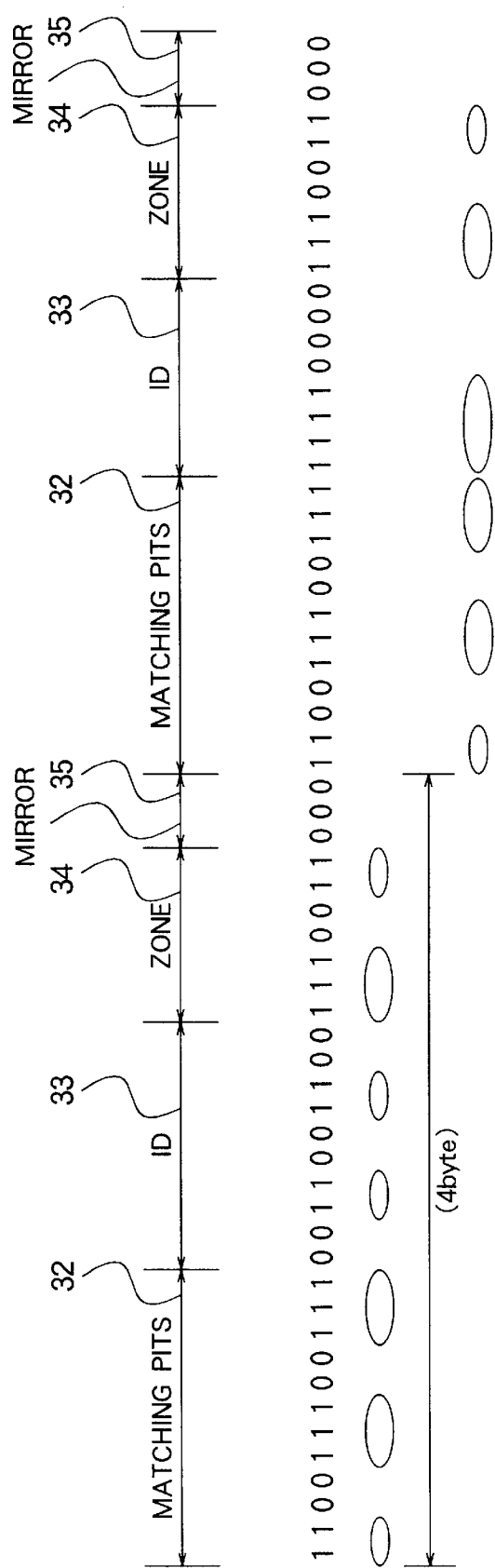
FIG. 11 shows a recognition pattern formed of 4 bytes, in an optical disk of Embodiment 1.

FIG. 11 shows an example of the recognition pattern 30 formed of 4 bytes.

FIG. 12 shows an example of the recognition pattern 30 formed of 3 bytes.

FIG. 13 shows an example of the recognition pattern 30 formed of 2 bytes.

As will be seen from FIG. to FIG. 13, the recognition patterns 30 in each subheader 5 are provided in pairs, and one of the recognition patterns in each pair is shifted from the rest of the pits in the subheader in the radially outward direction (downward in the drawings) by a track pitch. The reason for this will be described later In a land/groove disk shown in FIG. 1A, the land track 2 and groove track 1 form separate spirals. That is, one of the two spirals is formed only of lands 2 and the other spiral is formed only of grooves 1. In contrast, in an optical disk shown in FIG. 1B, a single continuous information track is formed by alternating the lands and grooves every revolution, so that each revolution of land is connected to another, adjacent revolution of groove, which in turn is connected an adjacent revolution of land, and so on.

In the optical disk shown in FIG. 1B, data is recorded along a single spiral track, as in CD (compact disk), so that track jump can be effected in the same way as in CD. In the optical disk shown in FIG. 1A, it is necessary that, after scanning all the way through one of the two continuous tracks, to jump from the tail end of said one of the two spiral tracks to the leading end of the other spiral track, and the recording rate is lowered at this point. An advantage, however is that, when forming a track by the use of a mastering device, tracing a simple spiral is adequate.

In the fabrication of the optical disk shown in FIG. 1B, the laser beam must be shifted in the radial direction by a track pitch, every revolution. A more serious problem is that it is necessary to switch the tracking error signal polarity every revolution, between that for lands and that for grooves, and offset associated with the polarity switching is problematical.

Moreover, with an optical disk for recording and reproduction, the linear speed is maintained constant by the used of the CLV (constant linear velocity), or variation in the linear speed is reduced by a method in which the disk is divided into several annular zones and the rotational speed speed is varied from one zone to another. In the case of the CLV rotation, the header parts for the respective sectors are not aligned in the radial direction, so that crosstalk interference from the prepits in the header part can be a problem. Accordingly, in general, the disk of the zone configuration shown in FIG. 2 is employed.

The configuration of the header part for each sector is such that, as shown in FIG. 3, the sub-headers are recorded radially shifted alternately by half a track pitch, so that separate addresses can be reproduced for the land and groove.

Figure 23A:
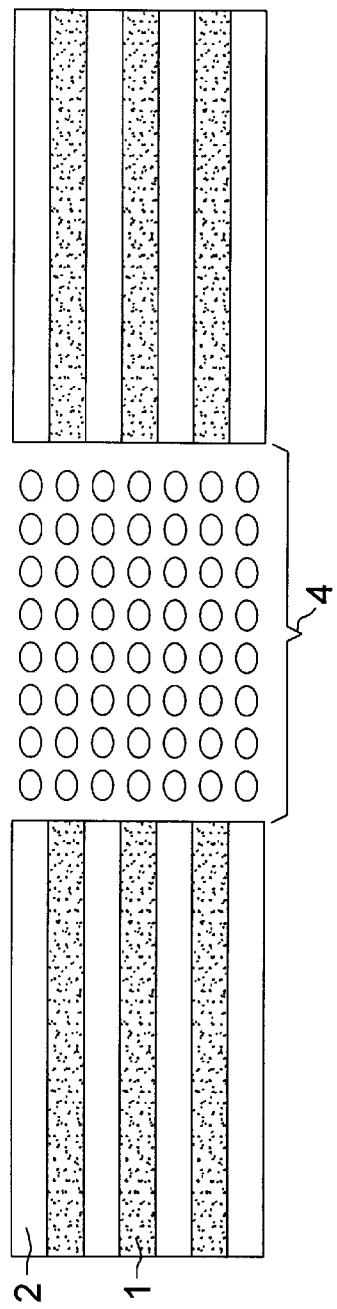
FIG. 23A and FIG. 23B show header parts in an optical head in the prior art.
Figure 23B:
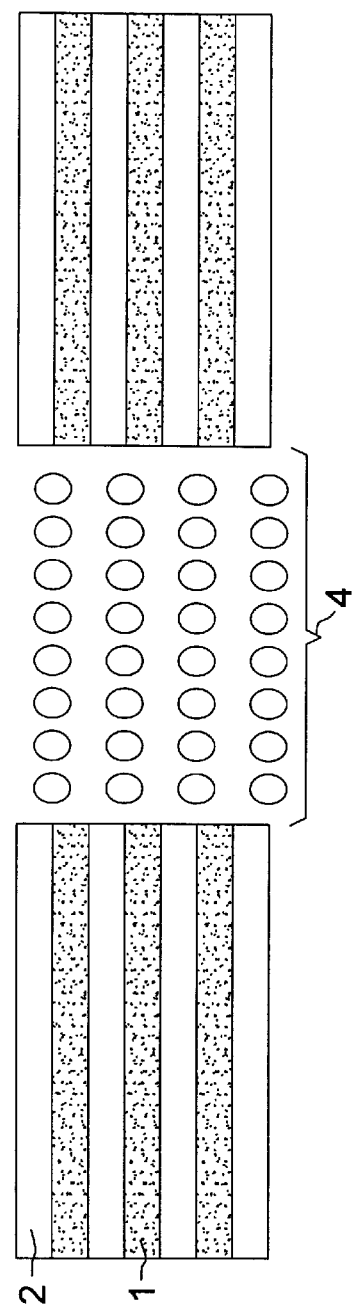
Figure 24:
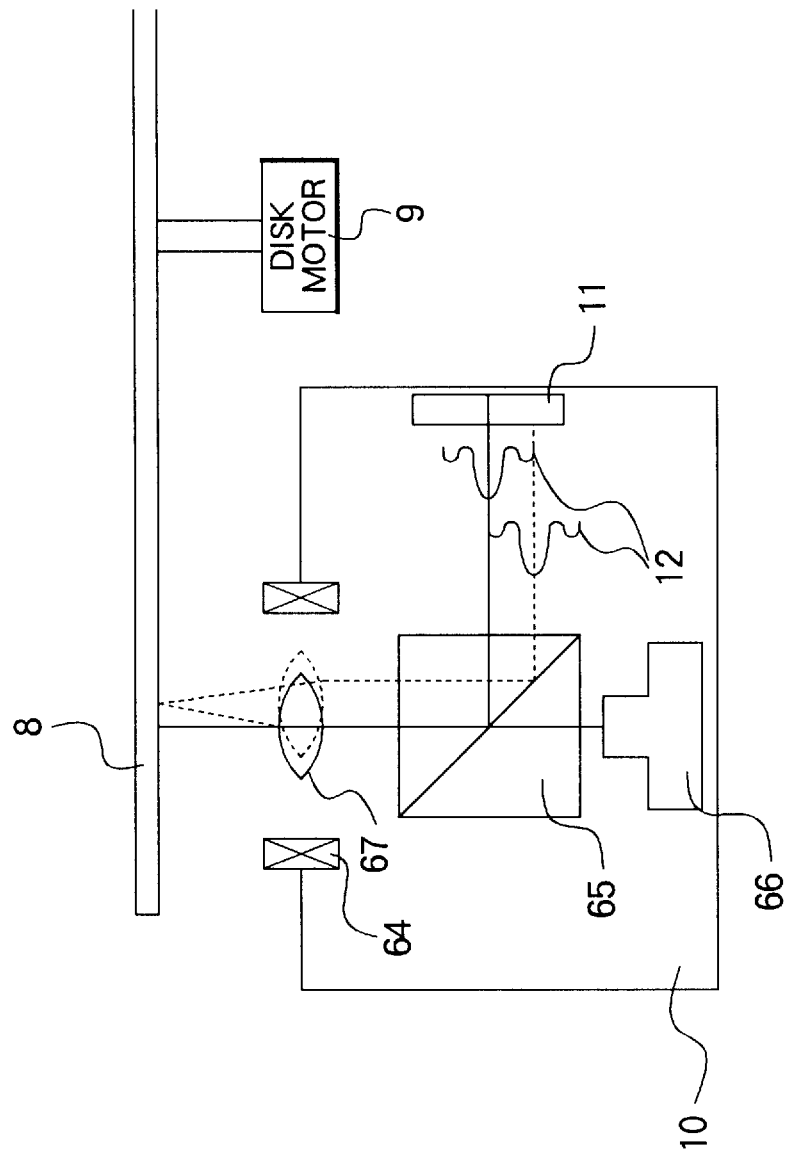
FIG. 24 shows how the offset is generated in the optical head.
Figures 25A, 25B:
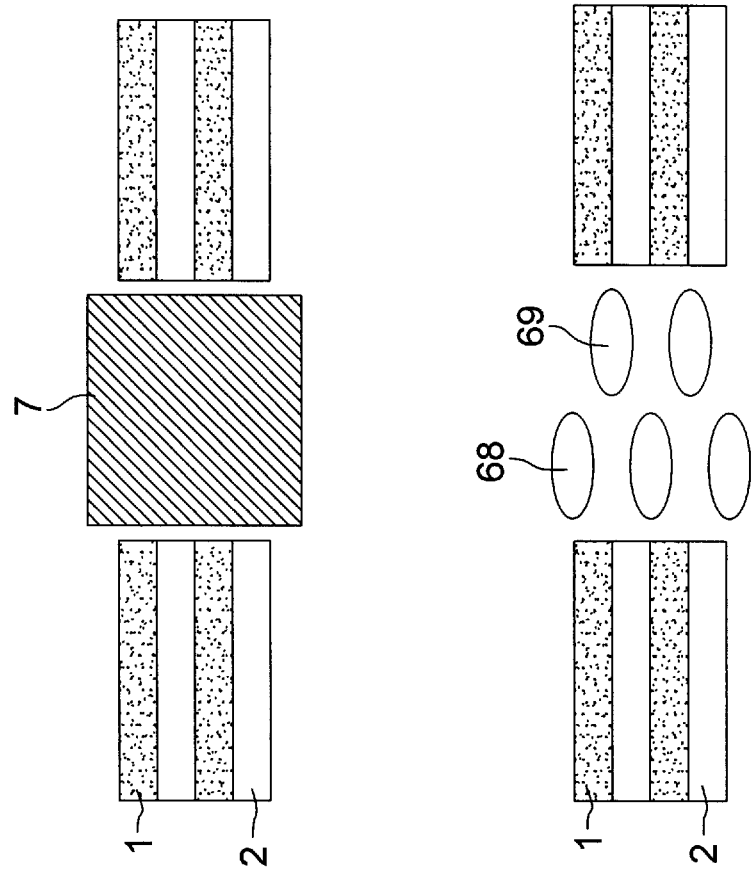
FIG. 25A and FIG. 25B show a mirror surface and wobble pits in an conventional optical disk.
Figure 26:
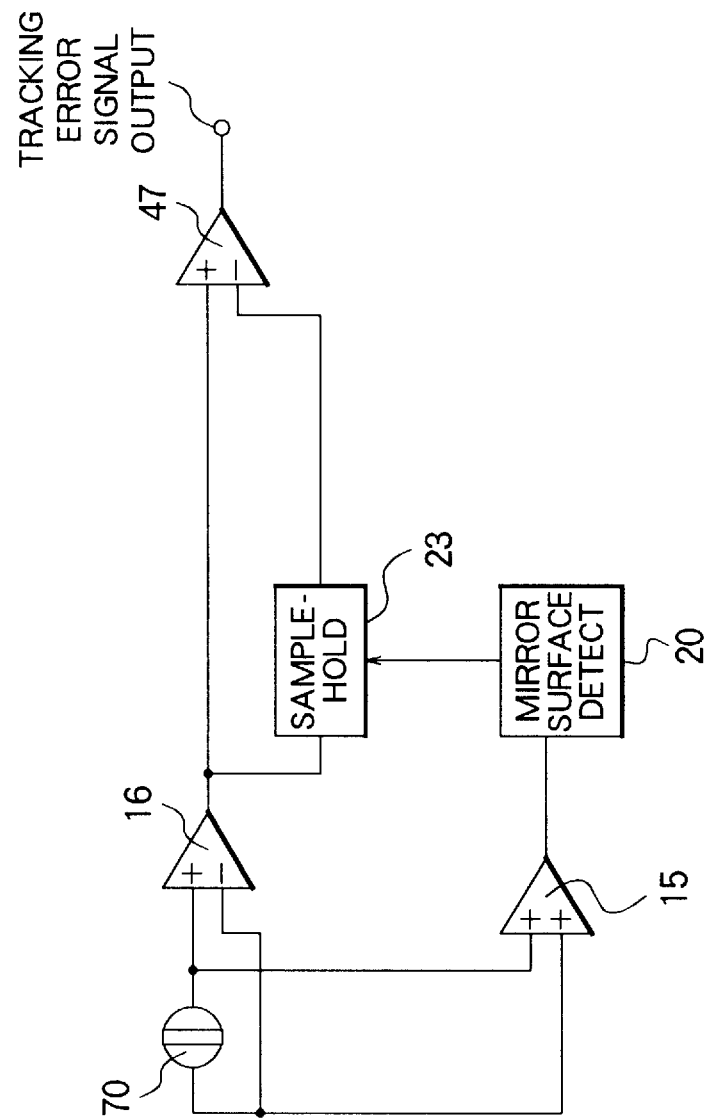
FIG. 26 is a block diagram showing a part of a conventional optical disk drive device concerning the tracking error signal offset correction using mirror surface parts.
Figure 27:
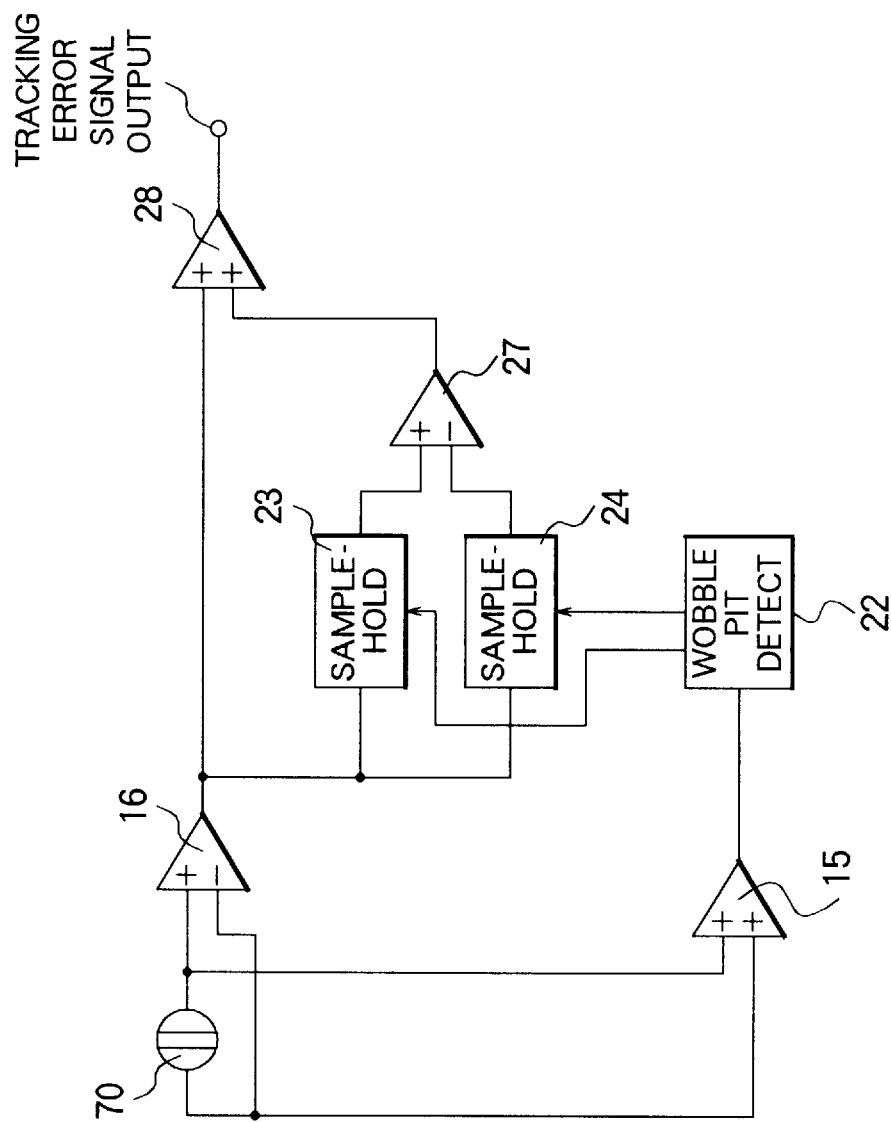
FIG. 27 is a block diagram showing a part of a conventional optical disk drive device concerning the tracking error signal offset correction using wobble pits.

With the conventional address pit configuration shown in FIG. 23A, a laser beam having an intensity different from that used for forming the grooves must be used for forming the pits in the headers. In the case of the configuration shown in FIG. 23B, the same address is reproduced during scanning of a land and a scanning of an adjacent groove, so that the it is not possible to determine, from the reproduced signal alone, whether the light spot is scanning a land or a groove.

With the configuration shown in FIG. 3 according to Embodiment 1, the address pits for the lands and grooves following the header parts are shifted in different radial directions, by half a track pitch, and being shifted also in the direction of the track, so that the address for the land and the address for the groove appear sequentially and in different radial directions with respect to the scanning movement of the light spot, so that it is possible to determine the address for the sector in each track from the reproduced data. For instance, when the groove track 1a is being scanned, the addresses are reproduced in the order of address A, address B, address A and address B. When the land track 2b is scanned, the addresses are reproduced in the order of address C, address B, address C and address B. From such a difference, and it is possible to determine whether the sector following the header region is in a groove track or a land track.

The address pits are disposed to form wobbling pits, and the mirror surface part 7 is provided, so that it is possible to remove the unnecessary offset of the push-pull sensor system, due to the shifting of the objective lens and the tilting of the disk.

Methods of removing offset which are known in the art includes mirror surface correction and wobble pit correction. In a usual optical disk capable of recording and reproduction, the configuration in which the groove is not provided at a specific location is formed by forming header parts for the sectors, and the information such as sector address and the like is written as embossed pits in advance. In the case of land/groove recording, if the embossed pits are formed as shown in FIG. 3, the address pits themselves can be used as wobble pits.

A problem associated with an optical disk in which lands and grooves alternate every revolution as shown in FIG. 1B, is that there is one header 4a per revolution where the tracking polarity must be switched.

The tracking error signal $\Delta T$ immediately before a servo compensation circuit, obtained in a push-pull method is given by the following equation:

$$\Delta T = \Delta Ts + \Delta Tg + \delta + \Delta Tt + \Delta Ti + \Delta Th \qquad (2)$$

where $\Delta Ts$ is a true tracking error signal;

$\Delta Tg$ is an offset due to the shift of the objective lens;

$\delta$ is an offset due to the tilting of the disk;

$\Delta Tt$ is an offset due to mounting error of the optical detector and stray light in the optical head;

$\Delta Ti$ is an offset from the detector to the polarity reversing circuit; and $\Delta Th$ is an offset from the polarity reversing circuit to the compensation circuit in a servo system.

The polarity of the true tracking error signal $\Delta Ts$ is reversed each time the track is changed from a land to a groove, or from a groove to a land. By reversing the polarity by the polarity reversing circuit 14, a correct track error signal can be obtained. Thus, the polarity reversal does no produce any problem with regard to $\Delta Ts$. On the other hand, the offset $\Delta Tg$ due to the shift of the lens, or the offset $\delta$ due to the tiling of the disk occur independently of whether the light spot is scanning a land or a groove. If the polarity of the tracking error signal were reversed without taking the above in consideration, the reverse offset would be applied. It is thus necessary to alter or update the amount of correction for the offset components $\Delta Tg$ and $\delta$ obtained by the wobble pit method or mirror surface method.

In a method using $\Delta Tg$ calculated from the objective lens position sensor of the optical head, or a method for correcting after storing ΔTg in a memory for one revolution of the track prior to tracking operation, correction will be made without reversing the polarity of ΔTg at the time of tracking error signal polarity reversal.

With regard to ΔTt and ΔTi, it is sufficient if the amounts of correction are determined before the device is used for operation, or when the device is shipped from the manufacturer, so that these offsets as well as ΔTh, are in many cases, corrected by the offset adjustment and the like of the servo circuit. However, while the polarities of ΔTt and ΔTi are reversed at the time of tracking error signal polarity reversal, ΔTh is not reversed. As a result, an offset error of ΔTt and ΔTi in the reverse direction may be created. For this reason, as shown in FIG. 4, the sample-hold circuit 23 is provided at the back of the polarity reversing circuit 14 to sample and hold the tracking error signal at the time when the light spot passes the mirror surface part 7, and on the basis of the output of the sample-hold circuit 23, the original tracking error signal (tracking error signal as output from the differential amplifier 16) is corrected by the differential amplifier 26. In this way, the correction of the offset, including ΔTt and ΔTi can be achieved.

By providing the sample-hold circuit 23 dedicated to the tracking error signal polarity reversal, as shown in FIG. 4, even when the address pits or the recognition flag for the sector at the connecting point is not detected, the offset correction value determined at the time of the preceding connecting point can be used, so that the disturbance of the servo operation due to the polarity reversal can be avoided. For instance, in the case of FIG. 4, the sub-header 5 is detected by the PLL and data detecting circuit 17 and the pattern matching circuit 18, and the offset due to the push-puss sensor is corrected by the tracking error signal due to the wobble pits. In addition, the connecting point detecting circuit 19 detects whether the sector in question is at a connecting point, and if the sector is found to be at a connecting point, the sample-hold circuit 22 is made to operate at the timing from the mirror surface detection circuit 20, and the differential amplifier 26 corrects the offset.

If the detection of the mirror surface fails at a connecting point because of a scratch on the disk, for example, then the offset value held by the sample-hold circuit 23 one period before is kept used, to ensure stable operation. If the detection also failed one period before, the value obtained two periods before is used. To generalize, the value obtained at the time of the latest successful detection of the mirror surface is used. This is because the connecting points are aligned in the radial direction of the disk, so that the offset ΔTt due to the mounting error of the photodetector 11 and the stray light in the optical head, the offset ΔTi from the photodetector 11 to the polarity reversing circuit 14, and the offset δ due to the tilting of the disk are substantially constant, and because the angle of rotation with respect to the direction of the eccentricity of the optical disk is also the same the offset ΔTg due to the shift of the objective lens is also substantially constant. The correction of offset at the connecting point varies substantially compared with the offset at the normal sectors, so that correction is indispensable.

Figure 28:
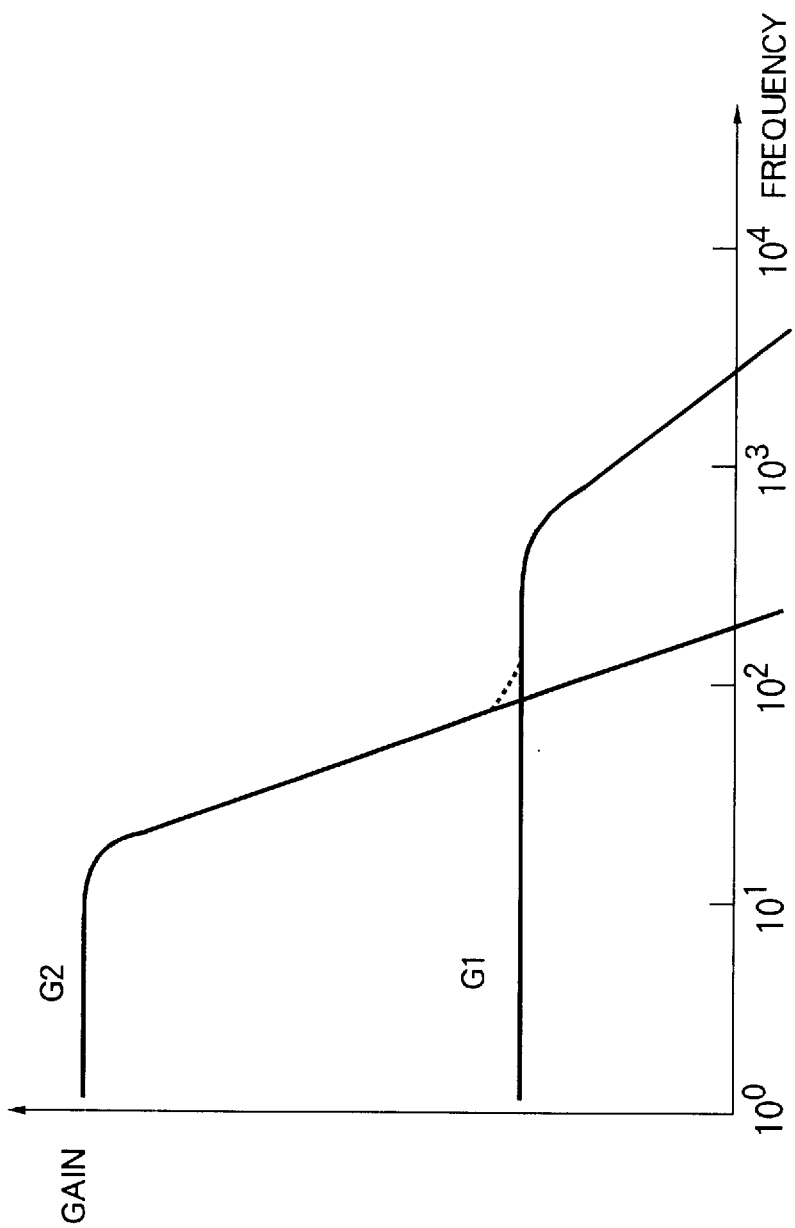
FIG. 28 shows control characteristics of the conventional optical disk drive using wobble pits and push-puss method
Figure 29:
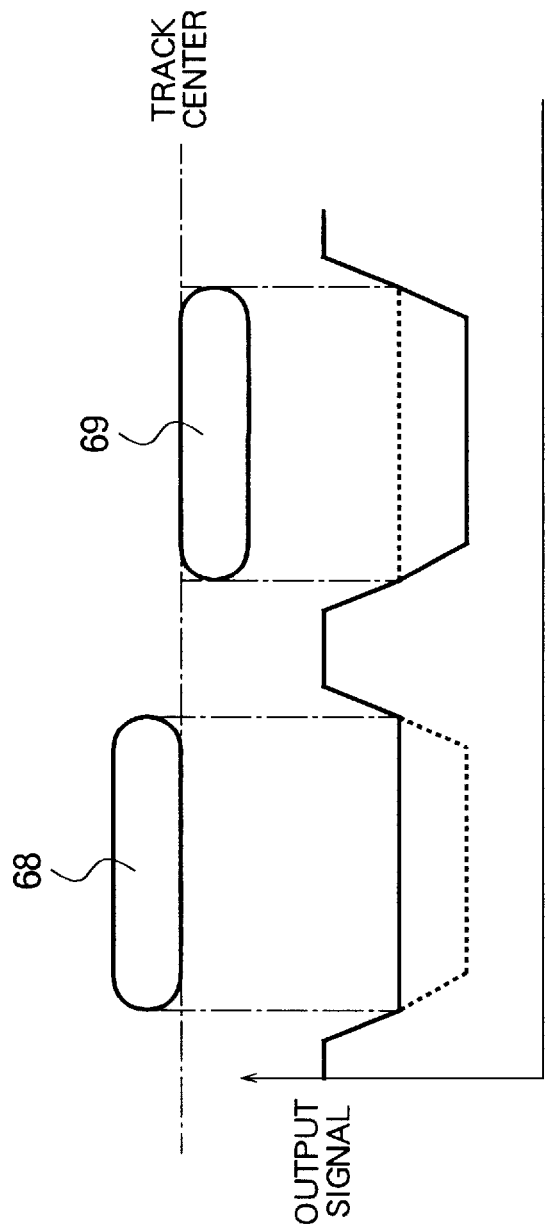
FIG. 29 is a diagram showing waveforms of the outputs obtained from the wobble pits.

The system having a correction circuit dedicated to the tracking error signal polarity reversal, and using the mirror surface detection is used in combination with the circuit using wobble pits to perform correction as shown in FIG. 4. In this case too, by creating a tracking error signal from the wobble pits by means of the differential amplifier 27, and adding the tracking error signal from the differential amplifier 27 to the original tracking error signal (supplied via the differential amplifier 16), whereby tracking operation is performed using the wobble pits, free from offset in the low-frequency region as shown in FIG. 28 can be achieved. In this case too, the amount of correction of the offset at the connecting point is large compared with the amount of correction at the normal sectors, so that offset due to the mirror surface alone is extracted, and used for feed-forward correction. The correction loop using the wobble pits is not accompanied with a rapid change even when tracking error signal polarity reversal is effected, and but with a slow change which can be corrected by a control loop having the gain G2 in FIG. 28.

In the above-described correction, the address pits in the sub-header 5 shown in FIG. 5 are reproduced, and the pattern matching signal is generated on the basis of the reproduced address data 31, and the polarity reversing circuit 14 is operates to reverse the polarity of the signal in accordance with this signal. Then, responsive to the pattern matching signal and the sample-hold timing signal generated, the tracking error signal at the time of the passage of the mirror surface is sampled and held.

Such offset correction is effected even for the disk shown in FIG. 1A in which the lands and grooves are not connected so that no polarity reversal is required. This is because the push-pull tracking error detection system has an offset due to the lens shift. When the above-described offset correction and polarity reversal are erroneous, failure in tracking might occur, and the reproduction of the entire sector is affected.

Accordingly, as shown in FIG. 5, the recognition pattern 30 is made of pits longer in the track linear direction than the normal address pits, and of a pattern which is not used in the modulation method of the address pits and recorded and reproduced data. In this way, distinction between the normal data and recognition data is facilitated, and the configuration of the pattern matching circuit can be simplified.

In recent years, block coding is used as modulation for recording and reproducing information. In this case, a ROM table for converting 8 bit data into 16 bit data, for instance, is provided, and such a combination of pit patterns that make the minimum and maximum reversal intervals satisfy a predetermined condition, and reduce variation in DSV (Digital Sum Value) is selected, and the selected combination is recorded in the ROM. In this way, encoding is enabled. By performing the above operation in the reverse order, decoding is enabled. In such block modulation system, there are a combination of patterns which are not contained in the above modulation pattern. Such patterns are used as the recognition patterns 30, so that it is possible to separate the recognition pattern 30 from other information recording data, for the purpose of the pattern matching. Moreover, by using the sequence of pits elongated in the disk linear direction (for instance, the minimum pit length is longer than the pits in the information recording part), the error rate at the time of detection of the recognition flag can be reduced.

If the recognition pattern 30 is different from one zone to another, as shown in FIG. 7, it is possible to determine, by scanning the recognition pattern 30, which zone the light spot is scanning in, and to use this information for the rotational control over the disk motor 9. For instance, if the rotational speed were incorrect in scanning a disk of a phase-change type which has a strong linear velocity dependency, the recording characteristic with regard to the laser power and the linear velocity would not match, and the over-writing and other recording information will not be successful. For this reason, the zone must be identified without fail. In the case shown in FIG. 7, there are three zones A, B and C, but there can be a different number of zones. A simple way is to provide as many number of recognition patterns 30 as the number of zones. If, however, it is difficult to provide as many number of recognition patterns 30 as the number of the zones, because the number of the zones is large and/or the number of pits for the recognition patterns 30 is limited, the arrangement may be such that the same recognition patterns may be used for different zones separated by one or more zones identified by different recognition patterns. For instance, if there are only three different recognition patterns, they may be used in turn, in the order of A, B, C, A, B, C, . . . In this case, in the case of a track jump from a first zone to a second zone, separated from the first zone by other zones, the rotational speed in the first zone (which is scanned before the track jump) is stored, the recognition patterns of the zones across which the track jump is effected are detected, and the number of repetitions of the recognition patterns during the track jump is counted. In this way, the second zone to which the track jump should be effected can be identified.

If, as shown in FIG. 10, an ID is described as part of the recognition pattern 30, the reliability of the detection of the recognition pattern 30 is further enhanced. For instance, where a plurality of recognition patterns 30 are provided in each sub-header 5, or where a plurality of sub-headers 5 are provided, different ID's 33 may be described. By reading the ID, the position of the recognition pattern 30 within the header 6 can be identified, and on the basis thereof, it is also possible to identify the timing of detection of the wobble pits, mirror surface part 35 in FIG. 10, or mirror surface part 7 in FIG. 3, or the position at which data recording begins.

By comparing the ID's 33 in a plurality of recognition patterns 30 that have been reproduced, it can be reconfirmed that the reproduced data is that of a recognition pattern. For this reason, the reliability is improved. For instance, if it is checked whether reproduced ID's 33 are sequentially incremented, a recognition pattern 30 with an ID 33 which does not satisfy the condition of the sequential increment is considered to be a wrong pattern (not a recognition pattern).

Unlike the case of FIG. 7, the recognition pattern 30 may consists of 4 to 2 bytes containing matching pits 32, ID 33, zone identifying part 34, mirror surface part 35, and the like, as shown in FIG. 11 to FIG. 13.

The mirror surface part 35 shown in FIG. 10 and FIG. 11 is used not only for removing the track offset, but also for indicating the start or end of a plurality of matching patterns, and the mirror surface part also forms part of the matching pattern.

The recognition pattern 30 can be detected more easily than the normal reproduced data or address information in the header part 6. Moreover, because the configuration is such as to ensure reliability, the recognition pattern may be made to contain information which is essential during land/groove recording, so as to ensure correct tracking and rotation control.

Embodiment 2

Determination as to whether the light spot is scanning a land or a groove can be achieved by reading the address data. For instance, if the disk is divided into annular zones and the number of sectors per revolution is constant in each zone, by reading the disk address, it is possible to determine whether the header part the light spot is scanning is at at connecting point from the sector number within the zone. For instance, if the number of sectors per revolution within a certain zone is m, and the sector with a number "0" is at a first connecting point (within the zone), the other connecting points are at the sectors with the number m×n (n being an integer). Accordingly, by detecting and decoding the sector address, the fundamental information such as whether the light spot is scanning a land or a groove can be obtained.

However, because of reading error during address data reproduction, the recognition of the above-mentioned fundamental information can be erroneous. Therefore, even if the current address cannot be read, since the addresses are sequentially incremented by one, by reading the addresses at one or more preceding sectors, the current address can be predicted and erroneous reading of the current address can be corrected. However, during initial track pull-in or pull-in after track access, identification must be achieved solely from the data in the header part for each sector. Moreover, it is desirable that the above-mentioned fundamental information can be read even if the tracking servo is not applied. If the recognition pattern 30 can be read in the state in which the focus is ON, it is possible to effect rotation control promptly, and a normal track crossing signal can be produced even with a disk having lands and grooves alternating every revolution.

In a disk in which lands and grooves alternate every revolution, it is necessary to determine whether the header part being scanned is at a connecting point. If, because of a scratch on the disk, for instance, an unnecessary polarity reversal is effected, failure of tracking may occur. Accordingly, it is essential to determine whether the header part being scanned is at a connecting point.

In an optical disk capable of re-writing, one-beam tracking is normally used, so that wobble pits and mirror surface part are provided for offset detection, and it is important to detect the timing for reading the wobble pits or mirror surface part. The detection of the offset timing and the determination as to whether the header part is at a connecting point must be achieved without fail even if there is a tracking deviation. The correction of the tracking deviation should be effected even when there is a track offset, and therefore the reproduction of the recognition pattern 30 must be achieved without fail even if there is a certain amount of track deviation. If the detection is achieved even if tracking is not achieved, the servo-pull-in and the like can be effected For this reason, as shown in FIG. 5, FIG. 6 and FIG. 9, a pair of recognition patterns 30 are provided, one after another in the track direction, and being shifted in the radial direction. That is, the first recognition pattern 30 of the pair is aligned with the rest of the pits in the subheader 5, while the second recognition pattern 30 is shifted radially outward (downward in the drawings) by one track pitch. Because the headers are radially aligned with each other within each zone, as shown in FIG. 2, the recognition patterns 30 are also radially aligned between successive tracks within each zone, as shown in FIG. 14. Therefore, if the successive recognition patterns 30 within each subheader 5 are shifted in the radial direction (laterally of the track), even when the tracking is deviated during reproduction and the light spot is deviated radially inward or radially outward, there is a higher probability that at least one of the recognition patterns 30 within one sub-header 5 can be reproduced.

In particular, since the address pits in the subheaders 5 are disposed, being shifted by about half a track pitch with respect to the information track, if the light spot is deviated toward one side of the track, pits on the other side are not reproduced. As a result, land/groove identification and removal of offset cannot be made. However, if the pair of recognition patterns are disposed, being shifted in the radial direction, as described above, one of the recognition patterns in the pair can be reproduced.

Moreover, in a state in which tracking is not applied, the scanning of the light spot is as shown in FIG. 14, so that the reproduction is possible, and reproduction is facilitated because of the above-described shifting of the recognition patterns.

However, where the recognition patterns 30 are disposed at equal intervals as shown in FIG. 14, if in a state in which tracking is not applied, the light spot scans along a trace β in the drawing, the recognition patterns 30 in the second and fourth sub-headers 5 (as counted from the left end) can be reproduced, while if the light spot scans along a trace α, none of the recognition patterns may be reproduced. The probability that the light spot scans along trajectory α may be sufficiently low. But because failure of reproduction of the recognition pattern 30 leads to the track counting error, or failure in servo-pull-in, it is desired that the cause for failure should be removed.

Figure 15A:
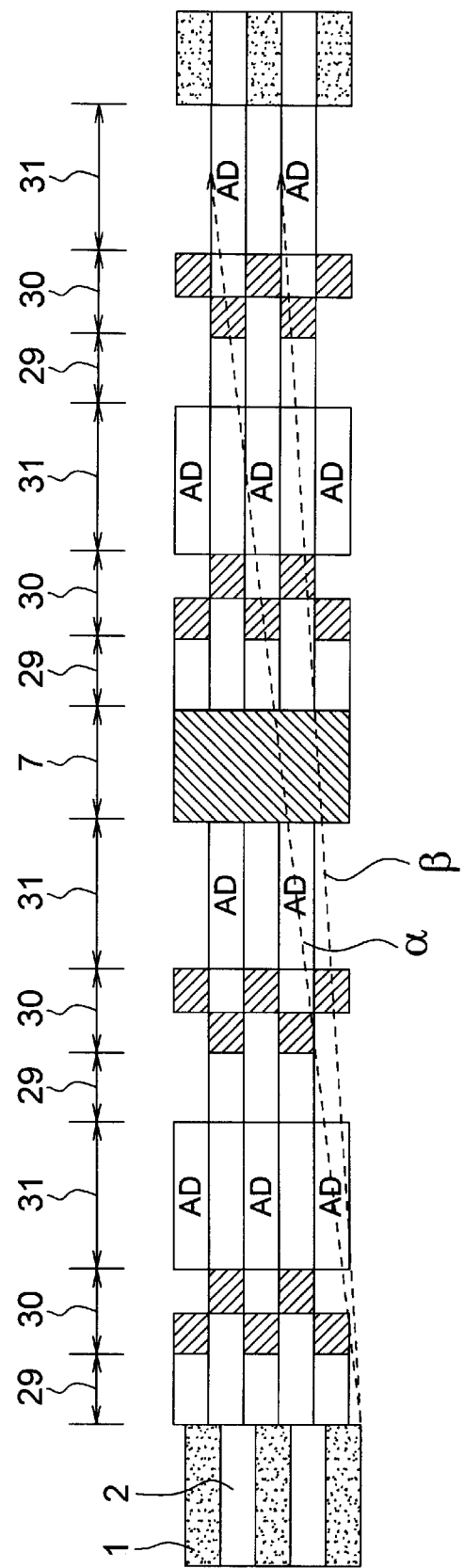
FIG. 15A shows another example of recognition patterns disposed at varying interval, and the traces of the light spot during track crossing, according to Embodiment 2.

For this reason, it may be so arranged that the interval between recognition patterns 30 is not constant. For instance, a mirror surface part 7 may be disposed between sub-headers 5, as shown in FIG. 15. In this case, when the light spot follows a trace α, the recognition patterns 30 in the third and fourth sub-headers 5 as counted from the left end can be reproduced. When the light spot follows a trace β, the recognition patterns 30 in the second and fourth subheaders 5 as counted from the left end can be reproduced.

Figure 15B:
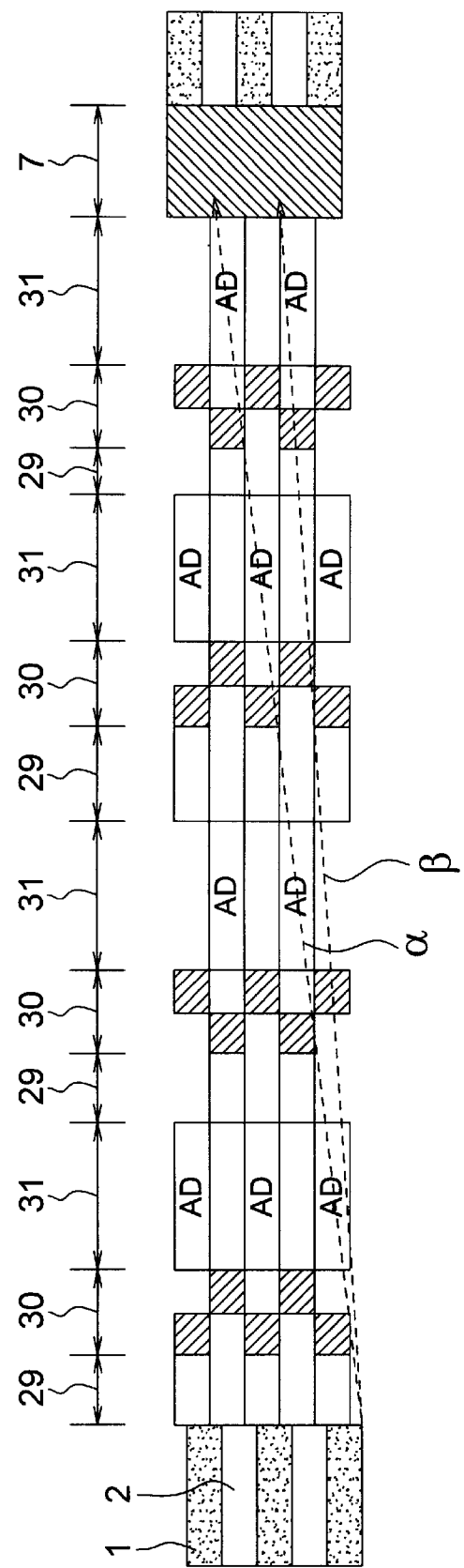
FIG. 15B shows a further example of recognition patterns disposed at varying interval, and the traces of the light spot during track crossing, according to Embodiment 2.

As an alternative (for making the interval between the recognition patterns 30 to be not constant), the length of the VFO 29 may be changed, as shown in FIG. 15B. In this case, the interval between the second and third sub-headers 5 as counted from the left end may be increased, and also the interval between the third and fourth subheaders 5 may be changed, so as to improve the probability of detection. The probability of detection of the recognition patterns 30 can be further improved by increasing the number of recognition patterns inserted in each subheader 5, from two as shown in FIG. 15, to, for example, three or four.

In the state in which tracking servo is not applied, the recognition patterns 30 can be reproduced, and the information indicating the zone can be obtained. As a result, the rotation control during access is enabled.

Moreover, by reading the recognition patterns, the timing for detecting the mirror surface part 7 can be obtained. Accordingly, the track offset can be removed during track access or before servo pull-in, so that the pull-in can be effected smoothly (pull-in with zero offset is possible).

In general, the light spot is led to the target sector during track access, by calculating the number of tracks to the target sector, and counting the number of waves of the tracking error signal (indicating the number of tracks crossed). During track crossing movement, the track crossing speed (speed of radial movement of the light spot) can be calculated from the waveform of the tracking error signal, and used to control the track crossing speed. Moreover, the sum signal indicating the amount of reflected light can be used to subtract the reverse-swing component due to the eccentricity of the disk to achieve accurate counting.

Figure 16:
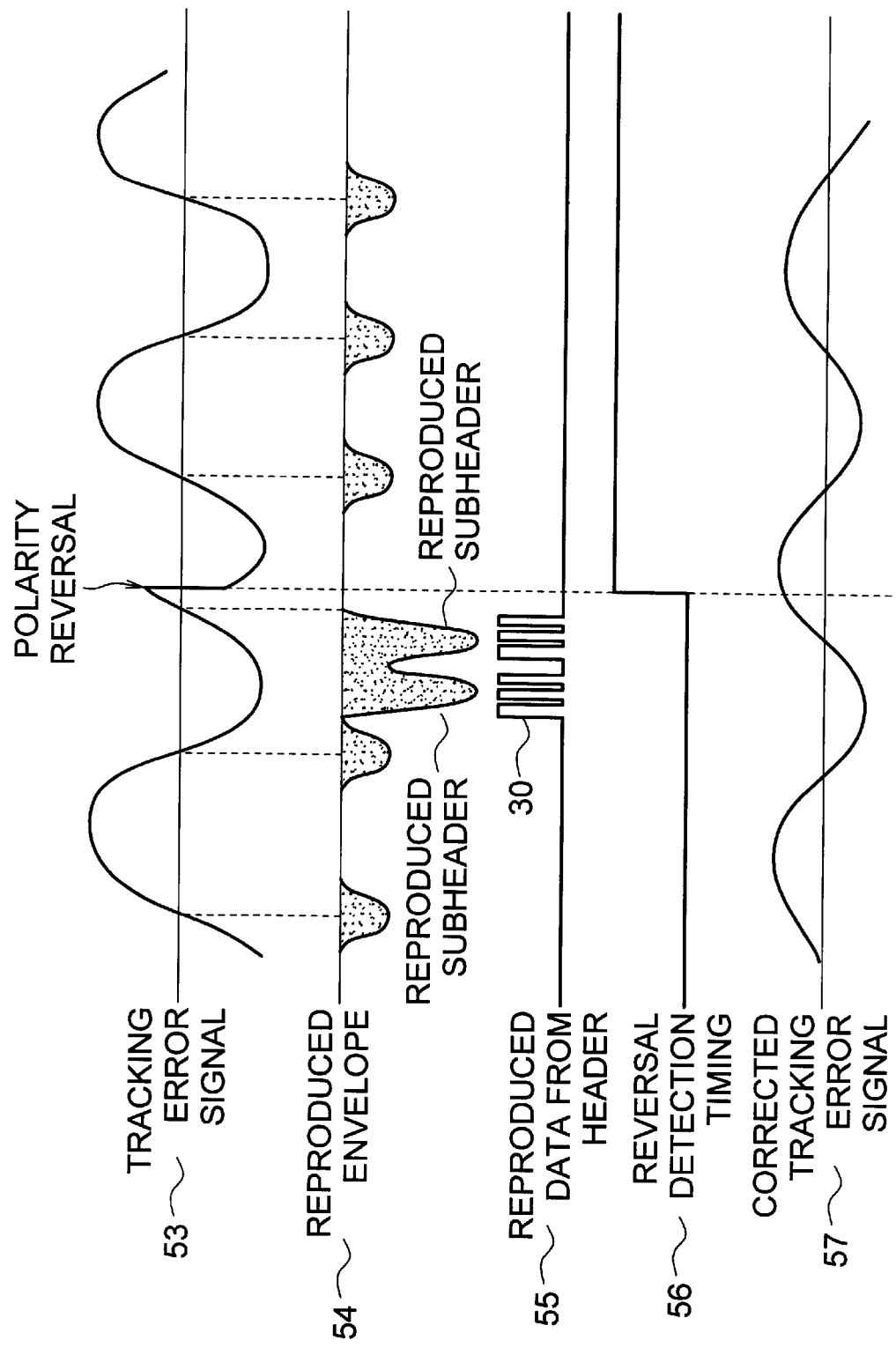
FIG. 16 shows signals during the track crossing according to Embodiment 2.

With the optical disk shown in FIG. 1A in which the lands and grooves alternate every revolution, the polarity of the tracking error signal is reversed every revolution, and the tracking error signal 53 shown in FIG. 16 is obtained. If the track counting is effected using this signal as is, track count errs at the connecting point, or, if the light spot is nearing the target sector, the light spot may be pulled into an adjacent track because of the difference in the tracking polarity. As a countermeasure, the timing of polarity reversal 56 is calculated from the signal 55 indicative of the recognition patterns, obtained from the reproduced envelope 54, and the original tracking signal 53 can be converted into a correct tracking error signal 57. With this arrangement, the track pull-in can be effected stably, and the track count can be achieved accurately.

Figure 17:
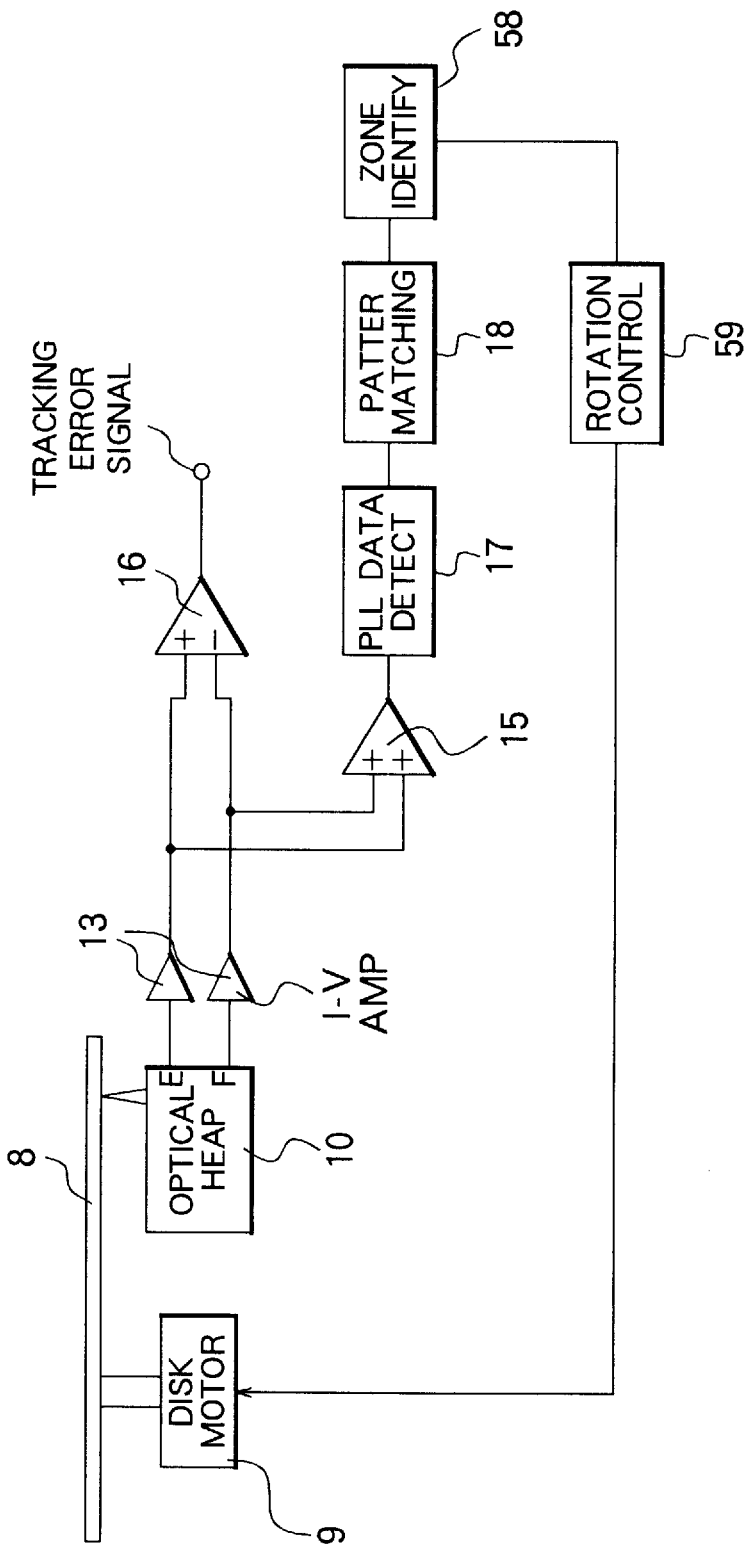
FIG. 17 is a block diagram showing a system for controlling rotation during track crossing according to Embodiment 2.
Figure 18:
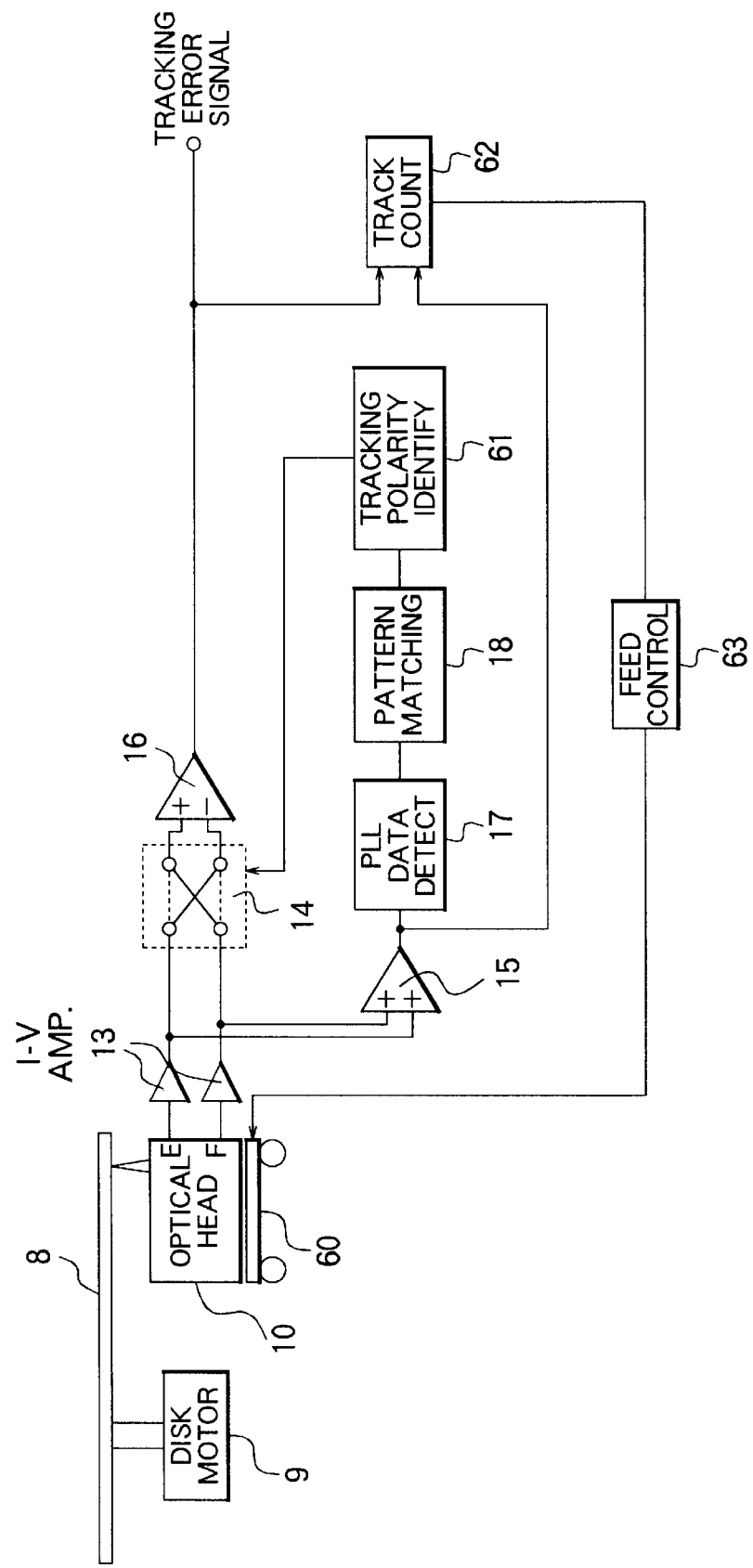
FIG. 18 is a block diagram showing a system for polarity reversal and track counting during track crossing according to Embodiment 2.

The optical disk drive device for reproducing the recognition patterns 30 before tracking or during track access is configured as shown in FIG. 17 or FIG. 18. The configuration shown in FIG. 17 includes a zone identifying circuit 58 and a rotation control circuit 59, and performs rotation control in a state in which the light spot is not tracking. The intermittent reproduced envelope signal 54 obtained while the light spot is crossing the tracks is passed through the PLL and data detecting circuit 17, to the pattern matching circuit 18, which recognizes the recognition pattern 30, and on the basis of the identified zone described by the recognition pattern 30, the zone identifying circuit 48 gives an instruction designating the rotation speed to the rotation control circuit 59. With such an arrangement, it is possible to perform rotation control even during track access, so that the time required for settling can be shortened. Similar operation is performed during track pull-in.

The configuration shown in FIG. 18 is used in combination with a disk shown in FIG. 1B to reverse the tracking polarity every revolution. It includes a linear motor 60, tracking polarity identifying circuit 61, a track count circuit 62, and a feed control circuit 63. The reproduced envelope signal during the track crossing, obtained at the output of the adder 15 is passed through the PLL and data detecting circuit 17 to the pattern matching circuit 18 which recognizes the recognition pattern 30. Further, the tracking polarity information contained in the recognition pattern 30 is read by the tracking polarity identifying circuit 61, and is used to control the polarity reversing circuit 14, which thereby perform the reversal of the polarity of the tracking error signal. On the basis of the tracking error signal 57 that has been corrected, i.e., that has its polarity reversed by the reversing circuit 14, track count is performed, and the result of the track count is sent to the feed control circuit 63, which thereby performs the feed control over the linear motor 60.

In a state in which tracking is not applied, it is possible to correct track offset as shown in FIG. 4, and if the track offset is corrected in the manner shown in FIG. 4, the track counting can be achieved more accurately. The reason is explained below. During track access, acceleration is exerted to the objective lens, and the position of the objective lens is shifted from the center of the actuator, and sensor offset due to the objective lens shifting occurs, as described in connection with the prior art. For this reason, there may be a shift from the reference voltage required for binarization for the purpose of counting the tracking error signal, and the binarization may not be successfully effected. For this reason, the circuit of FIG. 4 is made to operate during the track access, and the timing of detection of the mirror surface part is obtained from the recognition pattern, and used for the correction.

Figure 19:
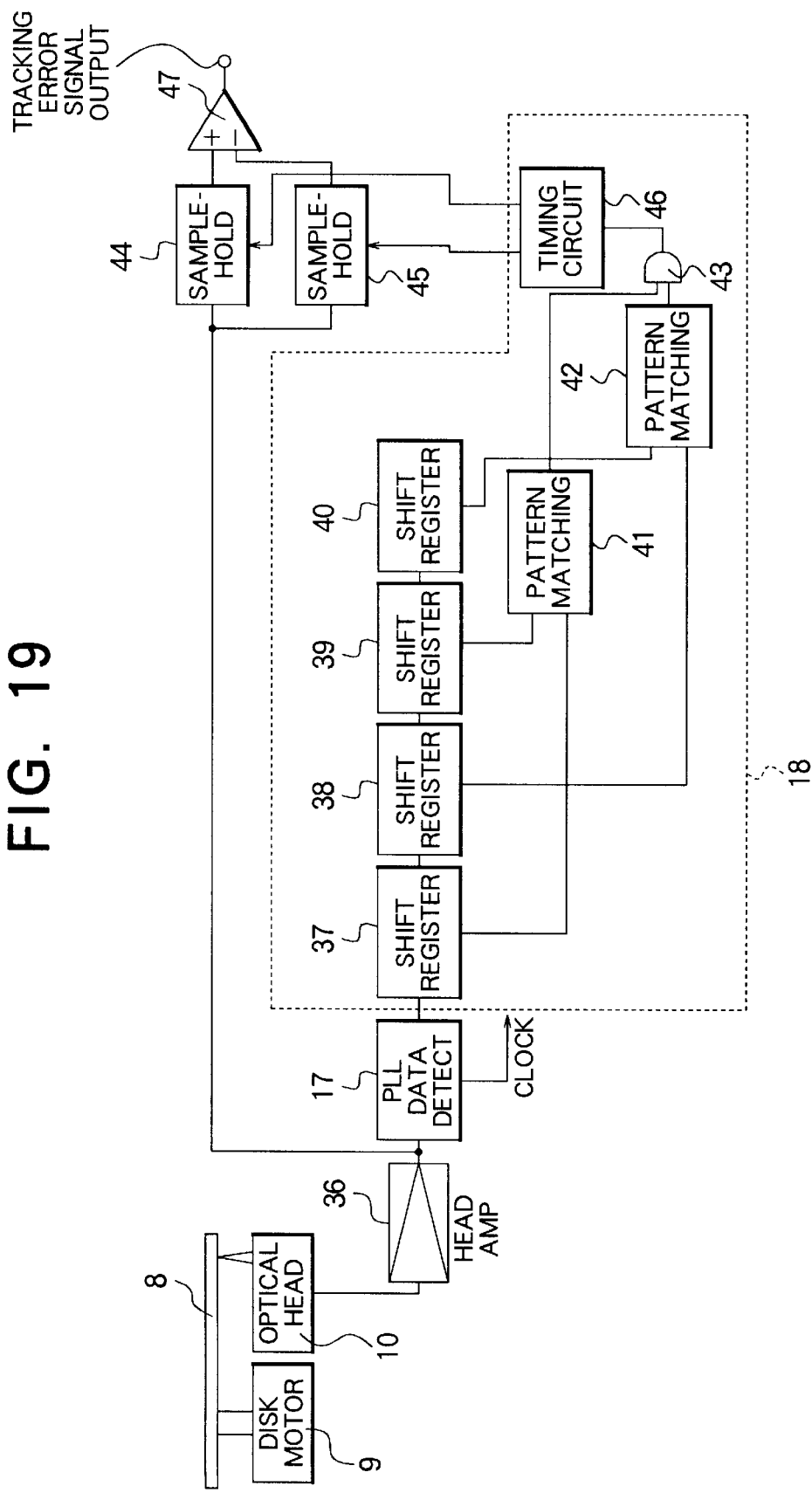
FIG. 19 is block diagram showing a pattern matching for the recognition patterns in an optical disk drive device according to Embodiment 2.

FIG. 19 to FIG. 22 shows the configuration of the pattern matching circuit 18. FIG. 19 shows the configuration showing a system including a pattern matching circuit 18 utilizing the repetition of the recognition pattern. It includes shift registers 37 to 40 for receiving the reproduced data in series, pattern matching circuits 41 and 42, an AND gate 42 determining the logical product of the outputs of the pattern matching circuits 41 and 42, a timing circuit 46 for obtaining timing for reading wobble pits formed of the subheader 5 itself, sample-hold circuits 44 and 45 for sampling the sum signal (output of the head amplifier 36) when the light spot scans the respective wobble pits, and a differential amplifier 47 determining the difference between the outputs of the sample-hold circuits 44 and 45.

Figure 20:
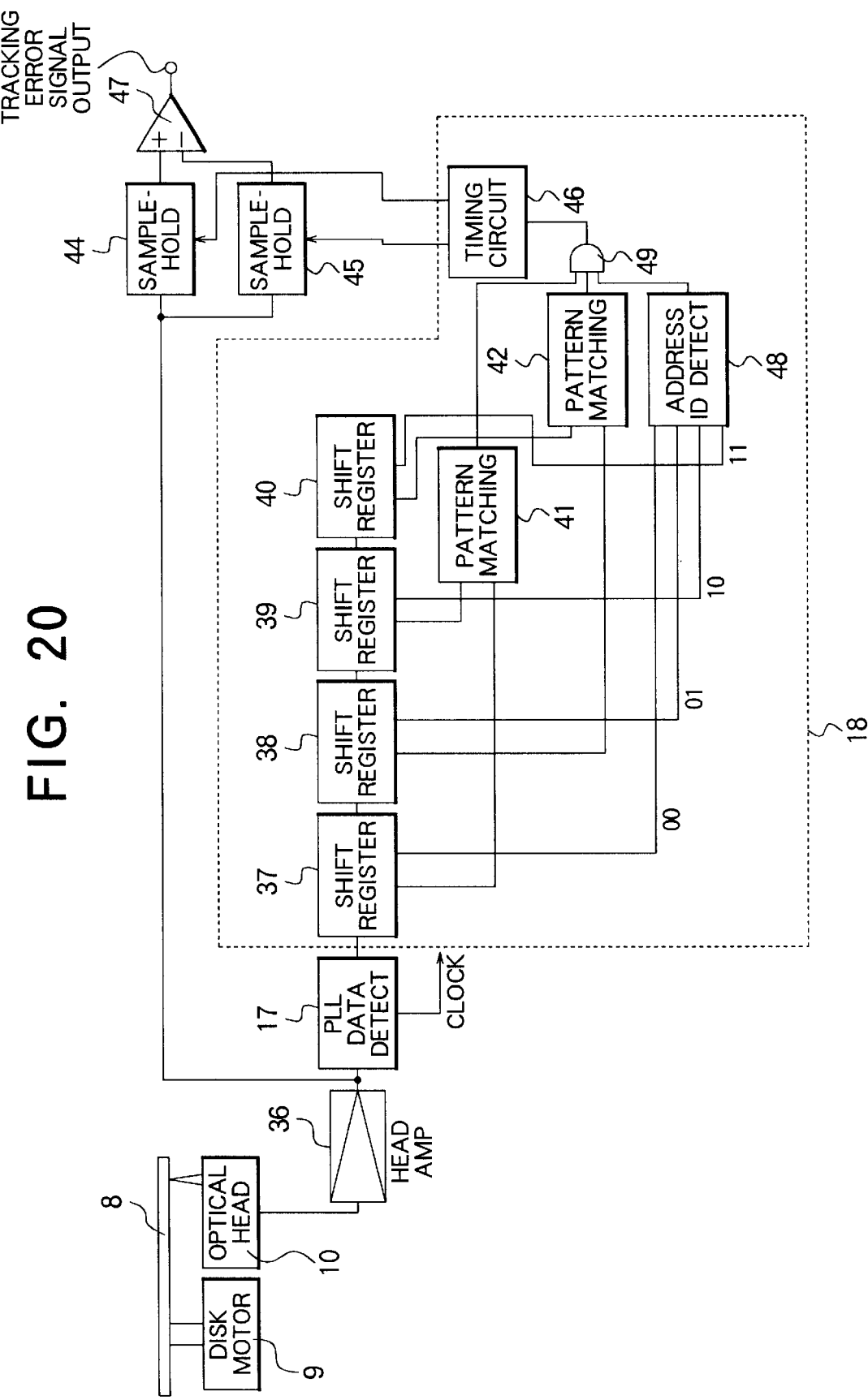
FIG. 20 is block diagram showing a pattern matching for the recognition patterns, in which matching of the ID is also applied.

The configuration shown in FIG. 20 is similar to the that of FIG. 19, but an address ID detecting circuit 48 is added. The address ID detecting circuit 48 is for performing matching from the ID contained in the recognition pattern 30. An AND gate 49 determines the logical product of the outputs of the pattern matching circuits 41 and 42, and the address ID circuit 48.

Figure 21:
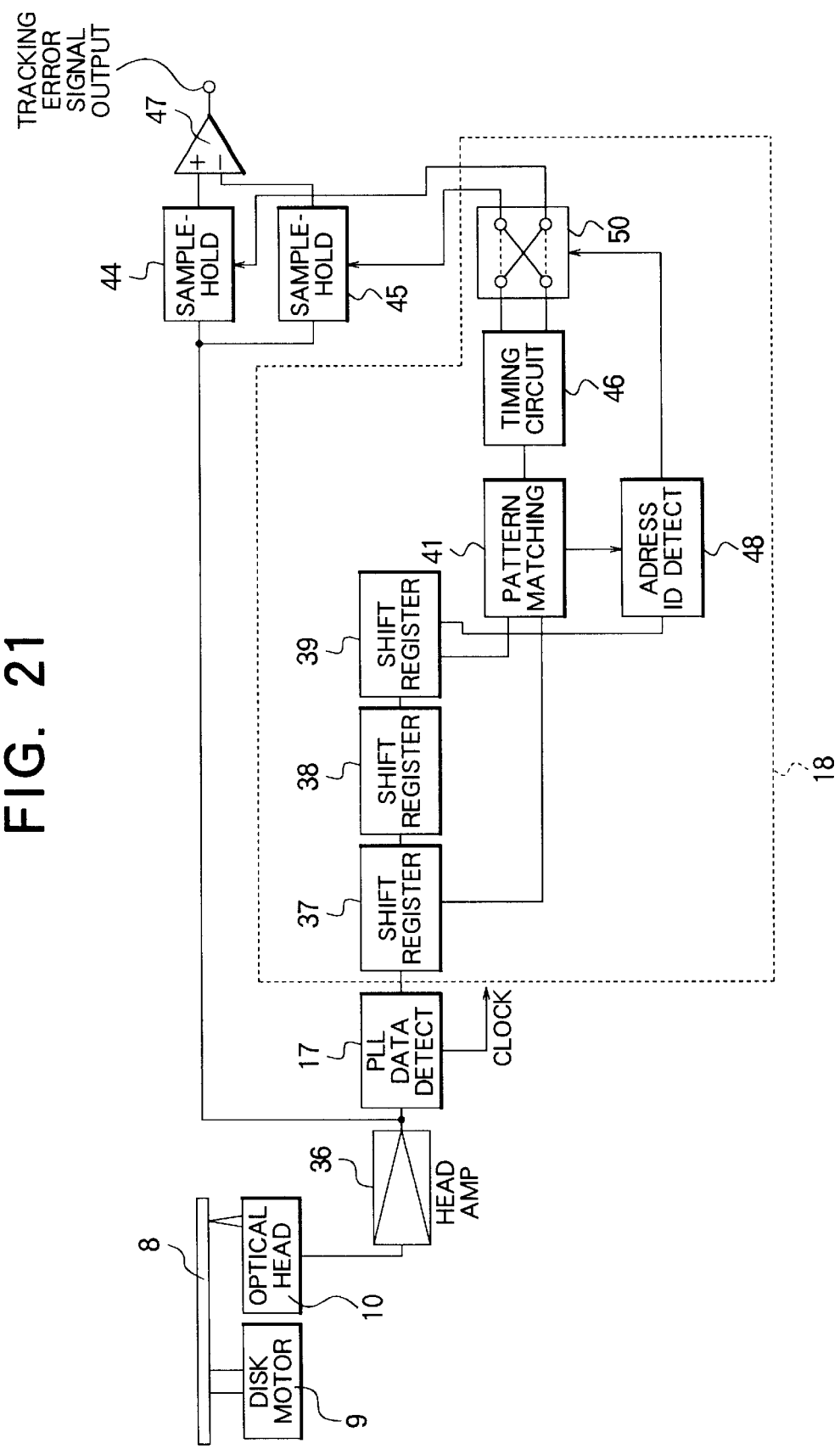
FIG. 21 is block diagram showing a pattern matching using the recognition patterns on one side only.

The configuration shown in FIG. 21 is similar to that of FIG. 20, but the circuits 40, 42, and 49 are omitted, and a polarity reversing circuit 50 is added. The configuration performs judgment of the recognition pattern on the basis of whether the recognition patterns 30 at the two subheaders 5 out of the four subheaders 5 coincide with each other.

Figure 22:
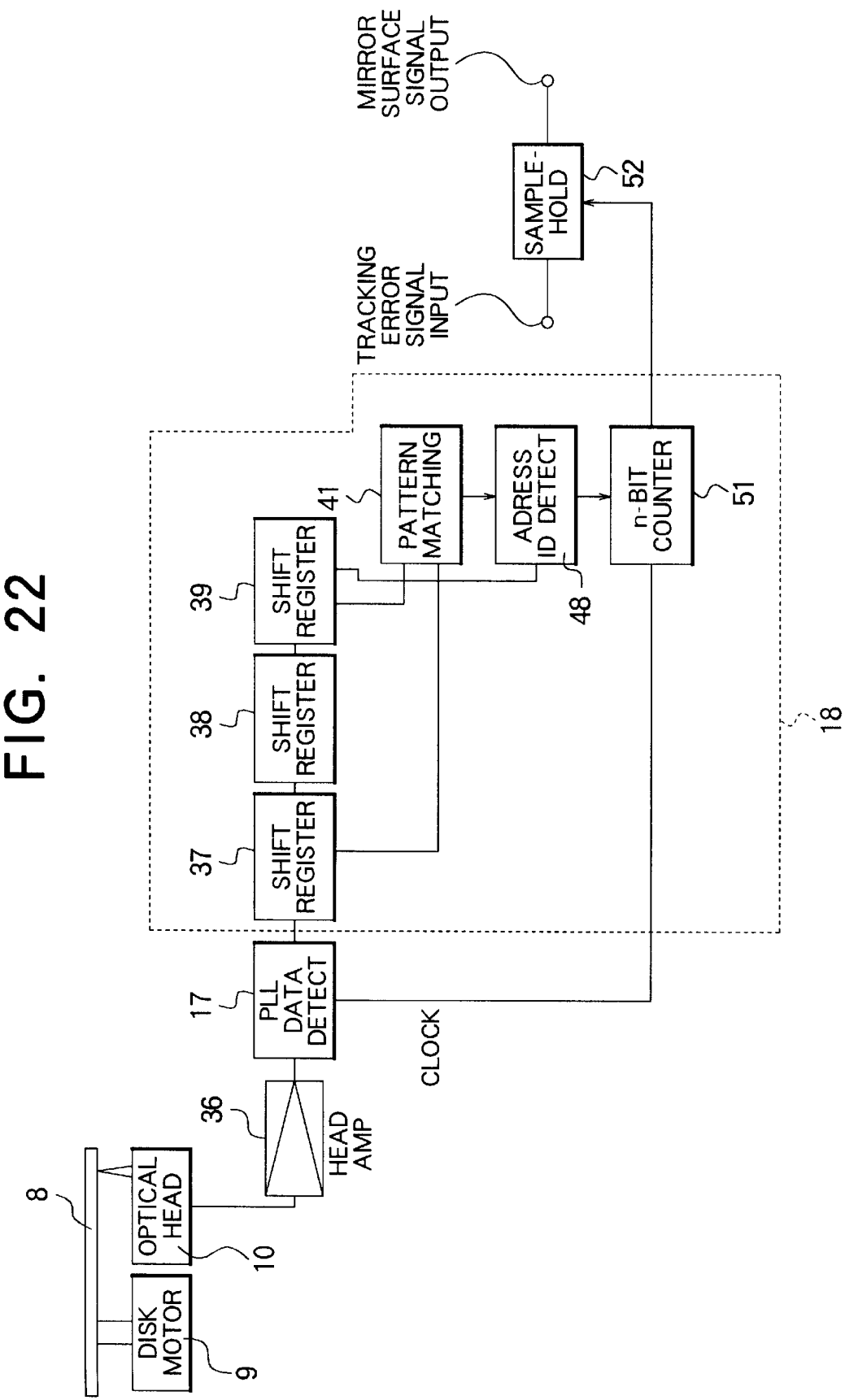
FIG. 22 is a block diagram showing a pattern matching using the recognition patterns on one side only, and offset correction.

FIG. 22 is a block diagram showing a pattern matching circuit 18 for determining the timing of detection of the mirror surface part by counting the PLL clock after address ID is detected. It includes n-bit counter 51, and a sample-hold circuit 52 for holding the tracking error at the mirror surface part.

With the pattern matching circuit described above, the matching pits 32 (FIG. 10, FIG. 11, FIG. 12, FIG. 13) are of a modulated pattern which is not used for recording data, and judgment is made whether the reproduced data is identical to that for assigned to the matching pits. However, there is a possibility that erroneous recognition is made because of scratch or track offset. As a countermeasure, it is possible to improve the reliability of detection, by utilizing the fact that the recognition patterns 30 of the subheader 5 are repeated (if the ID 33 is disregarded), as shown in FIG. 19. In the circuit shown in FIG. 19, when both of the pattern matching circuits 41 and 42 find matching, the timing for detecting wobble pits is obtained.

The concept of improving the reliability by repeating information can also be applied to checking whether the reproduced address data is correct. However, the recognition pattern 30 contains the most fundamental information, such as rotation of the motor, tracking polarity, and must be detected even in a state when the tracking is not applied. As a result, applying the concept of repeating information is more important with regard to the recognition pattern 30. The reliability is further improved, if, in combination with the above, the correctness is checked as to the incremented value at the ID 33.

In this case, an address ID detecting circuit 48 shown in FIG. 20 is used to perform matching with a predetermined pattern, such as "00011011." The pattern matching circuit 41 compares the outputs A and C of the first and third shift registers 37 and 39, while the pattern matching circuit 42 compares the outputs B and D of the second and fourth shift registers 38 and 40. This is for comparing the subheaders shifted in the same radial direction, i.e., for comparing the radially-outwardly-shifted subheaders with each other, and for comparing the radially-inwardly-shifted subheaders with each other.

When the pattern matching is effected using only such subheaders 5 that are shifted in one of the radially inward or outward directions, it is sufficient to compare the outputs A and C of the shift registers 37 and 39, as shown in FIG. 21. On the basis of the ID 33 detected in this manner, the timing of detecting the wobble pits is obtained. By setting the ID in an n-bit counter 51, and PLL clock is counted until the count reaches the set value, to obtain the timing of detection of the wobble pits. However, when the detection of the subheaders 5 is commenced at a middle, the order of detection of the wobble pits is reversed, so that the timing is reversed by the polarity reversing circuit 50 shown in FIG. 21. In this way, a tracking error signal free from offset can be obtained from the sum signal.

The configuration shown in FIG. 22 may be used to perform mirror surface correction in the same way as in FIG. 21. In this case, the output of the n-bit counter is connected to the sample-hold circuit 52, and the tracking error signal is sampled at the time of passage of the mirror surface part. With such a configuration, even in a state in which tracking servo is not applied, the recognition patterns 30 can be detected, and used for correction of offset at the mirror surface part 7, or to switch the tracking polarity.

In the system shown in FIG. 21 and FIG. 22 which uses only such subheaders 5 that are shifted in one of the radially outward and inward directions has a lower reliability than the system shown in FIG. 19, but is suitable in a state in which tracking servo is not applied, or when the recognition patterns are not fully obtained.

What is claimed is:

1. An optical disk comprising:

an information recording track formed of land and groove tracks arranged in a land/groove single-spiral configuration in which each land track is connected to adjacent groove tracks at connection points which occur each revolution so that land and groove tracks alternate every revolution to form a continuous spiral;

said disk being divided into a plurality of annular zones, each revolution of said information recording track belonging to one of the zones depending on the position in the radial direction of the track, each revolution of the information recording track being divided into a plurality of sectors of a unit length of information recording in the direction of the scanning, said disk having a header portion at the head of each sector, said header portion including a recognition pattern which is formed of a sequence of pits having a pattern which is not used as a pattern for data or address in the information recording part.

2. The optical disk according to claim 1, wherein said header portion for each sector has a plurality of sub-headers, including an address sub-header and first and second recognition patterns, the first recognition pattern being shifted in one radial direction by half a track pitch with respect to the center of the track of the sector and the second recognition pattern being shifted in the other radial direction by half a track pitch with respect to the center of the track of the sector.

3. The optical disk according to claim 1, wherein a mirror surface part is provided at the back of the recognition pattern.

4. The optical disk according to claim 1, wherein said recognition pattern is formed of pits of different lengths, the minimum length being longer than the minimum pit length of the signal of the data recorded in the information recording part.

5. The optical disk according to claim 1, wherein the recognition patterns in the header contains an identification code indicating the zone to which the sector belongs.

6. The optical disk according to claim 1, wherein the recognition patterns in the header contains an identification code indicating whether the information recording part of the sector is a land or a groove.

7. The disk according to claim 1, wherein multiple header portions are aligned in the radial direction, a header portion includes a plurality of recognition patterns, and the interval between the recognition patterns is varied.

8. The disk according to claim 7, wherein the interval between the recognition patterns is varied by varying the length of the VFO.

9. An optical disk comprising:

an information recording track formed of land and groove tracks arranged in a land/groove single-spiral configuration in which each land track is connected to adjacent groove tracks at land-groove connection points which occur each revolution so that land and groove tracks alternate every revolution to form a continuous spiral;

said disk being divided into a plurality of annular zones, each revolution of said information recording track belonging to one of the zones depending on the position in the radial direction of the track, each revolution of the information recording track being divided into a plurality of sectors of a unit length of information recording in the direction of the scanning, said disk having a header portion at the head of each sector, said header portion including a recognition pattern formed of a sequence of pits and identifying whether the sector is at a said land-groove connecting point, the recognition pattern being shifted in the radial direction from the center of the information recording track so as to be shared between radially adjacent land and groove track revolutions.

10. The optical disk of claim 9, further comprising an optical mirror portion adjacent the recognition pattern in the direction of tracking.

11. The optical disk according to claim 9, wherein a header portion includes a first recognition pattern and a second recognition pattern along the linear direction.

12. A method of tracking an optical disk comprising:

a) providing information on recording tracks in the form of land and groove tracks arranged in a land/groove single-spiral configuration in which each land track is connected to adjacent groove tracks at land-groove connection points which occur each revolution so that land and groove tracks alternate every revolution to form a continuous spiral;

b) arranging the information into a plurality of annular zones, each revolution of said information recording track belonging to one of the zones depending on the position in the radial direction of the track, each revolution of the information recording track being divided into a plurality of sectors of a unit length of information recording in the direction of scanning;

c) providing a header portion on said disk at the head of each sector, said header portion including a recognition pattern formed of a sequence of pits and identifying whether the sector is at a said land-groove connecting point, the recognition pattern being shifted in the radial direction from the center of the information recording track so as to be shared between radially adjacent land and groove track revolutions;

d) identifying whether a track is a land track or a groove track from said recognition pattern; and e) tracking the track, said step of tracking including the substep of modifying some characteristic of the tracking system based on whether said track is a land track or groove track.

13. The optical disk of claim 11 wherein header portions are aligned in the radial direction and the interval between the first and second recognition patterns is varied.

14. The optical disk according to claim 13, wherein the first recognition pattern is shifted in a first radial direction by half a track pitch with respect to the information recording track and the second recognition pattern is shifted in the opposite radial direction by half a track pitch with respect to the center of the information recording track.

15. The optical disk according to claim 9, wherein the recognition pattern includes an identification code indicating the zone to which the sector belongs.

16. The optical disk according to claim 9, wherein the recognition pattern is formed of pits of varying lengths, the minimum length of a pit in the recognition pattern being longer than the minimum pit length of a data signal in the recording track.

17. An optical disk having information recording tracks in the form of land and groove tracks arranged in a land/groove single-spiral configuration in which land tracks are connected to adjacent groove tracks at connecting points which occur each revolution so that land and groove tracks alternate every revolution to form a continuous spiral;

said disk being divided into a plurality of annular zones, each revolution of said information recording track belonging to one of the zones depending on the position in the radial direction of the track, each revolution of the information recording track being divided into a plurality -of sectors of a unit length of information recording in the direction of scanning, said disk having a header portion at the head of each sector, said header portion including a recognition pattern which is formed of a sequence of pits, and the interval between recognition patterns is varied.

18. The disk according to claim 17, wherein the interval between recognition patterns is varied by varying the length of a VFO region.

19. The disk according to claim 17, wherein said sequence of pits has a pattern which is not used to represent data or address information.

20. The disk according to claim 17, wherein said recognition pattern identifies whether the sector is at a connecting point between a land track and a groove track.

21. The disk according to claim 17, wherein the headers are aligned in the radial direction.

22. The optical disk according to claim 1, wherein the recognition pattern is shifted in the radial direction from the center of the information recording track so as to be shared between radially adjacent land and groove track revolutions.

23. A method of tracking an optical disk comprising:

a) providing information on recording tracks in the form of land and groove tracks arranged in a land/groove single-spiral configuration in which each land track is connected to adjacent groove tracks at land-groove connection points which occur each revolution so that land and groove tracks alternate every revolution to form a continuous spiral;

b) arranging the information into a plurality of annular zones, each revolution of said information recording track belonging to one of the zones depending on the position in the radial direction of the track, each revolution of the information recording track being divided into a plurality of sectors of a unit length of information recording in the direction of scanning;

c) providing a header portion on said disk at the head of each sector, said header portion including a recognition pattern formed of a sequence of pits and identifying a said land-groove connecting point;

d) identifying whether a track is a land track or a groove track from said recognition pattern; and e) tracking the track, said step of tracking including the substep of modifying some characteristic of the tracking system based on whether said track is a land track or groove track, wherein the interval between recognition patterns is varied.

24. The method according to claim 23, wherein the interval between the recognition patterns is varied by varying the length of a VFO region.

25. The method according to claim 23, wherein said sequence of pits has a pattern which is not used to represent data or address information.

26. The method according to claim 23, wherein said recognition pattern identifies whether the sector is at a connecting point between a land track and a groove track.

27. The method according to claim 23, wherein the headers are aligned in the radial direction.

* * * * *